(12) United States Patent
Berini et al.

(10) Patent No.: US 10,963,669 B2
(45) Date of Patent: *Mar. 30, 2021

(54) DEVICE FOR COLLECTING PERSONAL DATA FROM USER

(71) Applicant: NEXTGENID, INC., San Antonio, TX (US)

(72) Inventors: Dario John Berini, Ashburn, VA (US); Gary A. van Beek, North Gower (CA); Ilan Arnon, Ottawa (CA); Brian J. Shimek, San Antonio, TX (US); Robert Bryon Fevens, Nepean (CA); Robert Lloyd Bell, Ottawa (CA)

(73) Assignee: NEXTGENID, INC., San Antonio, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/163,230

(22) Filed: Oct. 17, 2018

(65) Prior Publication Data

US 2019/0050626 A1    Feb. 14, 2019

Related U.S. Application Data

(63) Continuation of application No. 15/017,261, filed on Feb. 5, 2016, now abandoned, which is a continuation (Continued)

(51) Int. Cl.
*G06K 9/00* (2006.01)
*G06F 21/34* (2013.01)
(Continued)

(52) U.S. Cl.
CPC ......... *G06K 9/00087* (2013.01); *G06F 21/32* (2013.01); *G06F 21/34* (2013.01);
(Continued)

(58) Field of Classification Search
None
See application file for complete search history.

(56) References Cited

U.S. PATENT DOCUMENTS

| | | |
|---|---|---|
| 4,614,378 A | 9/1986 | Picou |
| 5,375,168 A | 12/1994 | Kudelski |
| (Continued) | | |

FOREIGN PATENT DOCUMENTS

| | | | |
|---|---|---|---|
| CN | 201229620 | | 4/2009 |
| CN | 201229620 Y | * | 4/2009 |
| (Continued) | | | |

OTHER PUBLICATIONS

"CBES Multimodal Biometric Enrollment Station." 3M Cogent, Inc. [online], [retrieved on Dec. 11, 2012]. Retrieved from the Internet: <URL: http://www.cogentsystems.com/downloads/CBES_sm.pdf>.

(Continued)

*Primary Examiner* — Kaitlin A Retallick
(74) *Attorney, Agent, or Firm* — Shami Messinger PLLC

(57) ABSTRACT

A device for collecting personal data from a user includes a processor, a sensing device, a document scanner, and a scene camera. The sensing device is configured to capture a biometric of user. The document scanner is configured to produce a visual representation of an identifying document that includes personally identifying information. The scene camera monitors and captures a video of an uninterrupted area surrounding the kiosk including the user, the sensing device, and the document scanner. The processor transmits the captured video to a remote station that can send a signal back to the device.

20 Claims, 21 Drawing Sheets

Related U.S. Application Data of application No. 13/475,625, filed on May 18, 2012, now Pat. No. 9,256,719.

(60) Provisional application No. 61/487,463, filed on May 18, 2011.

(51) Int. Cl.
| | | |
|---|---|---|
| *G07C 9/25* | (2020.01) | |
| *G06F 21/32* | (2013.01) | |
| *G06F 21/60* | (2013.01) | |
| *G06F 21/62* | (2013.01) | |

(52) U.S. Cl.
CPC ........ *G06F 21/602* (2013.01); *G06F 21/6245* (2013.01); *G06K 9/00013* (2013.01); *G06K 9/00154* (2013.01); *G06K 9/00604* (2013.01); *G06K 9/00617* (2013.01); *G07C 9/257* (2020.01); *G07C 2209/02* (2013.01)

(56) References Cited

U.S. PATENT DOCUMENTS

| | | | |
|---|---|---|---|
| 6,012,049 | A | 1/2000 | Kawan |
| 6,694,433 | B1 | 2/2004 | Kolouch |
| 7,079,653 | B2 | 7/2006 | Scheidt et al. |
| 7,095,852 | B2 | 8/2006 | Wack |
| 7,212,632 | B2 | 5/2007 | Scheidt |
| 7,278,026 | B2 | 10/2007 | McGowan |
| 7,738,660 | B2 | 6/2010 | Scheidt |
| 7,817,800 | B2 | 10/2010 | Wack |
| 7,890,887 | B1* | 2/2011 | Linardos ............... G16H 40/63 715/810 |
| 7,974,410 | B2 | 7/2011 | Scheidt |
| 8,077,870 | B2 | 12/2011 | Wack |
| 8,233,785 | B1* | 7/2012 | Surma ................. G03D 15/005 396/1 |
| 2001/0037301 | A1 | 11/2001 | Shepley |
| 2001/0054148 | A1* | 12/2001 | Hoornaert ........... H04L 63/0853 713/172 |
| 2002/0019941 | A1 | 2/2002 | Chan |
| 2002/0026413 | A1 | 2/2002 | Wu |
| 2002/0046086 | A1 | 4/2002 | Pletz |
| 2002/0105665 | A1* | 8/2002 | Wasilewski ........ H04N 1/00193 358/1.13 |
| 2002/0154344 | A1* | 10/2002 | Beeman ............. H04N 1/02815 358/475 |
| 2003/0001010 | A1* | 1/2003 | Schmidt ................ G06Q 20/20 235/385 |
| 2004/0182921 | A1 | 9/2004 | Dickson |
| 2005/0116052 | A1 | 6/2005 | Patton et al. |
| 2005/0174613 | A1* | 8/2005 | Tan ........................ H04N 1/387 358/486 |
| 2005/0229007 | A1* | 10/2005 | Bolle ....................... G06K 9/00 713/186 |
| 2006/0073883 | A1 | 4/2006 | Franks |
| 2006/0213970 | A1 | 9/2006 | Trajkovic |
| 2007/0117083 | A1* | 5/2007 | Winneg .................... G09B 7/00 434/350 |
| 2008/0046984 | A1* | 2/2008 | Bohmer .............. H04L 63/0853 726/5 |
| 2008/0296374 | A1 | 12/2008 | Gonen |
| 2009/0034803 | A1 | 2/2009 | Matos |
| 2009/0130905 | A1 | 5/2009 | Wang |
| 2009/0192938 | A1* | 7/2009 | Amos ................. G06Q 20/1085 705/43 |
| 2009/0222318 | A1* | 9/2009 | Anelevitz .......... G06Q 30/0237 705/304 |
| 2009/0235086 | A1 | 9/2009 | Lai |
| 2010/0059587 | A1* | 3/2010 | Miller ................ G06Q 20/4014 235/379 |
| 2010/0274728 | A1* | 10/2010 | Kugelman ........... G06Q 10/087 705/80 |
| 2010/0290668 | A1* | 11/2010 | Friedman ........... G06K 9/00255 382/103 |
| 2010/0329301 | A1* | 12/2010 | Pang ...................... A61B 5/015 374/121 |
| 2011/0025074 | A1* | 2/2011 | Reznar ................. E05B 15/108 292/33 |
| 2011/0122995 | A1 | 5/2011 | Ferro, Jr. |
| 2011/0178930 | A1 | 7/2011 | Scheidt |
| 2012/0030108 | A1* | 2/2012 | Katina ................. G06F 21/305 705/43 |
| 2012/0087643 | A1 | 4/2012 | Paramadilok |
| 2012/0176220 | A1* | 7/2012 | Garcia ..................... G09B 7/00 340/5.83 |
| 2012/0284513 | A1* | 11/2012 | Yerli ....................... H04L 67/38 713/168 |

FOREIGN PATENT DOCUMENTS

| | | |
|---|---|---|
| EP | 1744264 | 1/2007 |
| JP | 2007132678 | 5/2007 |
| JP | 2009175745 | 8/2009 |
| WO | WO 99/30267 | 6/1999 |
| WO | 2012159070 A2 | 11/2012 |

OTHER PUBLICATIONS

"Law Enforcement Product Overview." 3M Cogent, Inc. [online], [retrieved on Dec. 11, 2012]. Retrieved from the Internet: <URL: http://www.cogentsystems.com/downloads/LE_Oveiview.pdf>.

"VB E-PASS® KIOSK" Vision-Box [online], [retrieved on Dec. 11, 2012]. Retrieved from the Internet: <URL: http://www.vision-box.com/solutions/vbepass/>.

"VB E-PASS® DESKTOP" Vision-Box [online], [retrieved on Dec. 11, 2012]. Retrieved from the Internet: <URL: http://www.vision-box.com/solutions/vbepassdesktop/>.

"VB E-PASS® PORTABLE" Vision-Box [online], [retrieved on Dec. 11, 2012], Retrieved from the Internet: <URL: http://www.vision-box.com/solutions/mobile-vbepass/>.

"VB E-PASS® DISPENSER" Vision-Box [online], [retrieved on Dec. 11, 2012]. Retrieved from the Internet: <URL: http://www.vision-box.com/solutions/vb-i-dispenser/>.

"VB I-MATCH" Vision-Box [online], [retrieved on Dec. 11, 2012]. Retrieved from the Internet: <URL: http://www.vision-box.com/solutions/vb-i-match/>.

"VB SENTRYSPIDER" Vision-Box [online], [retrieved on Dec. 11, 2012]. Retrieved from the Internet: <URL: http://www.vision-box.com/solutions/vb-sentryspider/.

International Search Report dated Nov. 23, 2012 which issued in corresponding International Patent Application No. PCT/US2012/038675 (5 pages).

Written Opinion dated Nov. 23, 2012 which issued in corresponding International Patent Application No. PCT/US2012/038675 (5 pages).

Michaels, Ross J., Kevin C. Mangold, Matthew L. Aronoff, Kayee Kwong, and Karen Marshall. Specification for WS-Biometric Devices (WS-BD). Mar. 14, 2012. 1-123.

"Verona Healthcare Kiosk", Olea Kiosks, Inc., Product Brochure, Undated, retrieved at least as of Mar. 10, 2016 (2 pages).

"Self Service Kiosk", MorphoTrust USA, Product Brochure, Sep. 2012 (4 pages).

"SITA Automated Passport Control Kiosks", Presentation to the Greater Orlando Aviation Authority, By: John Powell on Sep. 21, 2013 (13 pages).

"Speed Capture Solution", Global Enterprise Technologies Corp., Product Brochure, Undated, retrieved at least as of Mar. 14, 2016 (2 pages).

First Interview Office Action, U.S. Appl. No. 16/163,217, dated Apr. 30, 2020, 5 Pages.

Pre-Interview Office Action, U.S. Appl. No. 16/163,217, dated Jan. 30, 2020, 5 Pages.

Applicant-Initiated Interview Summary, U.S. Appl. No. 16/163,217, dated Apr. 30, 2020, 2 Pages.

* cited by examiner

DEVICE FOR COLLECTING PERSONAL DATA FROM USER

TECHNICAL FIELD

The present invention relates to biometric and identity enrollment solutions, and, particularly, to biometric enrollment kiosks for capturing, for example, face, iris, fingerprint, signature, and document data.

BACKGROUND

Biometric systems are used to collect biometric information from individuals for issuance of identifying documents, identity badges, credit cards, and documents entitling people to benefits. These systems generally collect information such as fingerprints, facial images, and/or other biometric data. A local operator is generally required to monitor, perform in-person proofing, and guide the collection process. If any documents are required to be collected from an individual, such documents are manually scanned and verified by the physically present operator in a time-consuming process. As a result, the document proofing process is left to the judgment of an operator that has little experience and limited exposure to the totality of acceptable document types. As a result and for example, some enrollment and document collection processes may require at least 45 minutes.

BRIEF SUMMARY

The present invention relates to biometric solutions including face, fingerprint, signature, and dual iris biometric capture, processing, quality checking and matching in addition to identity documentation collection and proofing. Specifically, the present invention relates to a biometric and identity enrollment station, which may be self-service or operator assisted, with either a remote or local on-site operator, or both. The biometric enrollment station may be a desktop or countertop kiosk, or a stand-alone station. The biometric enrollment station is easily transported and installed.

Conventional biometric systems suffer from a number of problems. It has been discovered that one of the problems is switching or fraud during the enrollment process. For example, a person having no criminal or otherwise suspect background could attempt to go through all or part of an enrollment process on behalf of a person having a criminal or otherwise suspect background. Moreover, conventional biometric systems are generally only monitored on-site by an operator, or in other words, the area surrounding a particular biometric system cannot be monitored remotely. Fraud may occur in such systems as an enrollee can more easily influence an on-site operator to allow another person to act fraudulently as an imposter and go through all or part of the enrollment process. Conventional biometric systems also require an on-site operator to instruct the applicant each step of the enrollment process, to inspect the proof of identity breeder documents and to ensure that there is no switching or fraud. The cost of the on-site operator significantly increases the cost of biometric and identity enrollment, while leaving open the possibility for fraud. Conventional biometric systems are not designed for remotely supervised operation. These and other issues with conventional biometric and identity enrollment systems result in significant monetary losses and other disadvantages.

Moreover it has been discovered that conventional biometric systems are prone to component theft and destruction since all the components of such systems are generally not integrated into one distinct unit but are composed of separate components loosely connected by wires or cables. Biometric systems are generally placed in publicly accessible locations, thus, the issue of component theft or tampering is persistent. The conventional systems often use cameras and other components that have wide use, making them attractive objects for theft. Such conventional systems are also difficult and time-consuming to transport and are prone to unauthorized component rearrangement by unauthorized personnel. Transport of such systems generally requires all the components to be disconnected from one another and to be transported as separate units. The systems then need to be reassembled at their destination by an expert technician since there are many different components, cables and power units that require proper connection. Accordingly, conventional biometric systems require expert technicians to install or reinstall, and such systems require considerable time for the assembly and subsequent testing.

It has been further discovered that another problem in the conventional art occurs when shadows and other factors degrading the quality of the images obtained by image capture devices that impact biometric matching outcomes. Yet another problem in the conventional art is providing a device that meets the requirements of the Americans with Disabilities Act (ADA) and other government regulations for those enrollees hampered by mobility and reach issues. In addition to this, conventional devices are encumbered by stationary height locations of required capture components causing degraded and low quality capture of required enrollee biometrics. Still another problem in the conventional art relates to operator maintenance of an enrollment kiosk without compromising the security of the data being collected. As discussed above, another problem in the conventional art is the relatively long time period required to process a single enrollee. Conventionally, the entire enrollment process may require at least 45 minutes, which makes the process difficult to employ on a large-scale basis, especially in high traffic areas such as airports.

It has been discovered that another significant concern with conventional enrollment stations is that they are dependent on remote server response and verification of enrollee information or enrollee credentials. Such systems are impracticable and unusable in cases of emergencies, especially those emergencies that affect large segments of the population, such as natural disasters, health epidemics, etc. In such situations, fast and efficient identity verification is needed the most, yet, conventional server-dependent systems are unable to provide fast and efficient identity verification as the servers cannot cope with the large volume of calls coming through. Thus, in cases of an emergency, the servers seize due to request volume and identity verification cannot be performed, which, in essence, defies one of the major purposes behind having biometric enrollment stations in the first place since they are needed the most in cases of emergencies. Accordingly, there is a significant and pressing need for systems that are able to complete the biometric enrollment process without requiring any support or feedback from a server or remote entity.

Moreover, the conventional systems are not configured to be modifiable to individual customer demands. In other words, conventional systems have a pre-set configuration that may not be changed. Over time, customer needs and demands change and the conventional systems force customers to purchase entirely new systems as those needs become required. In biometric enrollment systems, many of factors depend on government requirements and specifications, which often change. Conventional systems are unable to simply remotely update the software and/or change the hardware to meet these new government specifications.

The present invention includes a fully integrated, modifiable, enrollment card-centric, and ergonomically presented biometric kiosk or enrollment kiosk for attended, remote supervision, or self-service use that overcomes these and many other problems in the conventional art.

In one aspect of the present invention, a biometric enrollment kiosk for collecting personal data includes a main module and at least one modifiable section removably coupled to the main module. The main module includes a processor and one or more biometric sensing devices coupled to the processor. The one or more biometric sensing devices include a right fingerprint sensor coupled to the processor and a left fingerprint sensor coupled to the processor. The right fingerprint sensor is positioned proximate a right end of the main module and the left fingerprint sensor is positioned proximate a left end of the main module. The right fingerprint sensor is positioned a predetermined distance apart from the left fingerprint sensor. The at least one modifiable section includes at least one first input device coupled to the processor.

In another aspect of the present invention, a method of collecting personal data with an enrollment station includes continuously monitoring, by a scene camera coupled to a processor, an area surrounding the biometric enrollment station to prevent fraud and/or the ability to allow for remote operator proofing. The method further includes inserting, by a person, a smartcard into a smartcard reader coupled to the processor; acquiring, by at least one fingerprint sensor coupled to the processor, at least one fingerprint from the person; and acquiring, by the processor via at least one first input device coupled to the processor, images of at least one identifying document. The method also includes encrypting, by the processor, all the collected personal and enrollment processing metrics data.

In another aspect of the present invention, a biometric enrollment kiosk for collecting personal data includes an adjustable main module, a lift unit slidably coupled to the main module, and at least one modifiable section removably coupled to the main module. The main module includes a processor and one or more biometric sensing devices coupled to the processor. The one or more biometric sensing devices include at least one fingerprint sensor coupled to the processor and at least one camera coupled to the processor. The main module is configured to move axially along the lift unit. The at least one modifiable section includes at least one first input device.

In a further aspect of the present invention, a biometric enrollment kiosk for collecting personal data includes a main module and at least one modifiable section removably coupled to the main module. The main module includes an embedded web service component and one or more biometric sensing devices coupled to the web service component. The one or more biometric sensing devices includes a right fingerprint sensor coupled to the web service component and a left fingerprint sensor coupled to the web service component. The right fingerprint sensor is positioned a predetermined distance apart from the left fingerprint sensor; and. The at least one modifiable section includes at least one first input device coupled to the web service component.

In yet another aspect of the present invention, the biometric enrollment process is completed in about 5 minutes or less. In another aspect, the biometric enrollment system is easily transportable.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other advantages of the present invention will become apparent upon reading the following detailed description and upon reference to the drawings. Reference characters and numbers refer to the same parts throughout the various views whenever possible. The drawings are not necessarily to scale, emphasis instead being placed upon illustrating principles of various embodiments of the invention. Where illustrations refer to specific manufacturer and model numbers for hardware elements of various embodiments of the invention, the references are intended to be illustrative, not restrictive. It will be obvious to those skilled in the art that a variety of equipment supporting similar functions may be substituted for the components actually shown in the illustrations.

FIG. 15 is an image where the background of the image is a covered liquid crystal display (LCD) monitor switched on;

Figure 1:
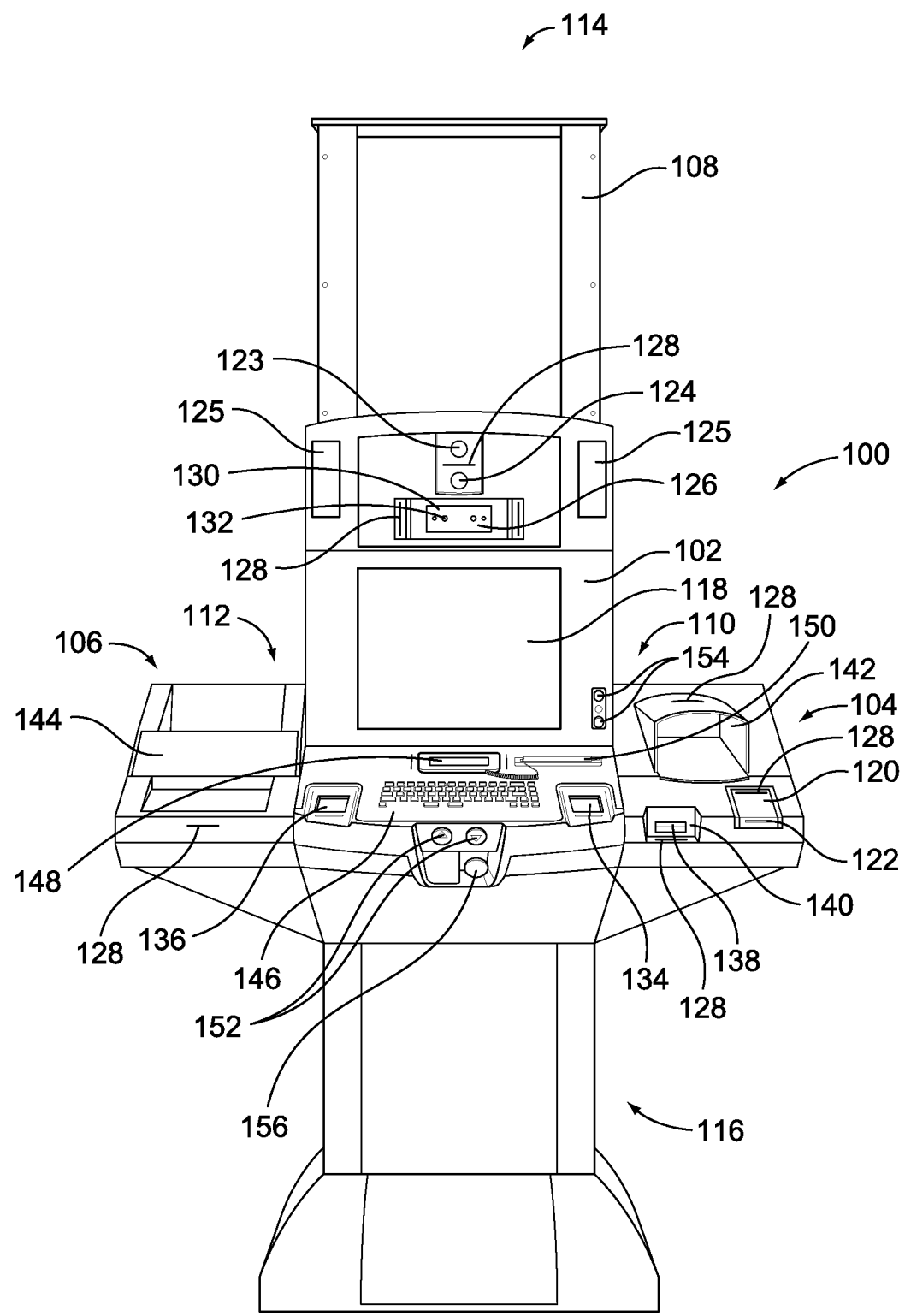
FIG. 1 illustrates a perspective view of a self-service accessible multi-biometric enrollment (MBE) kiosk.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Multimodal Biometric Enrollment Kiosk

FIGS. 1A-E illustrates an example kiosk 100 designed according to aspects of the present invention. The kiosk 100 is designed to be a flexible, multi-application, multi-customer (i.e., government agencies) shared biometric enrollment kiosk. The kiosk 100 is designed to accommodate a range of custom configurations without impacting the core functionality and associated software. The kiosk 100 is designed for: quality biometric image capture with automated quality checking against government standards, including U.S. Government Homeland Security Presidential Directive 12 (HSPD-12) for Personal Identity Verification (PIV and PIV-I), accessibility for the disabled in accordance with government regulations, such as the Equality Act 2010 (United Kingdom) and the ADA (United States), reliability for long life in public places, self-service or local or remotely supervised operations, ease of maintenance, security, privacy, ease of use, minimum transaction time, transaction audit trail, performance reporting, and compliance with applicable standards.

FIG. 1 is a perspective view of the multimodal biometric enrollment kiosk 100 with a main module 102, a right modifiable section 104, a left modifiable section 106, and a lift unit 108. The main module 102 includes a right end 110 and a left end 112. The right section 104 and the left section 106 are fully customizable based on customer needs and interchangeable. The changes may also be made post-production. In other words, the components listed as being coupled to or located on the left section 106 may be coupled to or located on the right section 104. Similarly, the components listed as being coupled to or located on the right section 104 may be coupled to or located on the left section 106. Moreover, additional components may be added or different components may be substituted for the components shown on the left section 106 and right section 104.

The right section 104 is removably coupled to the right end 110 of the main module 102. The left section 106 is removably coupled to the left end 112 of the main module 102. The main module 102 mounts on and is slidably coupled to the lift unit 108. The main module 108 is configured to move axially between a top end 114 and a bottom end 116. The kiosk 100 is configured to accommodate enrollees of various heights, including enrollees of heights between about 3 feet (0.91 m) and about 7 feet (2.13 m) or above. The kiosk 100 is configured to accommodate individuals that are wheel-chaired, including petite sized individuals.

The main module 102 includes a screen 118 that may be a touchscreen monitor. The screen 118 may have a diagonal of about 18 inches (0.46 m) or any other suitable size. When an enrollee approaches the kiosk 100, the kiosk 100 may be adapted to detect that an enrollee is present using one or more of scene camera 123, face camera 124, or dual iris camera 126. In another aspect, the enrollee can prompt the kiosk 100 to begin the enrollment session by touching the touchscreen 118. After detection of the enrollee, the kiosk 100 detects the face and/or eyes of the enrollee using one or more of the cameras 123, 124, or 126, and the kiosk 100 lowers or rises from its starting height to a height that matches or aligns with the level of the eyes of the enrollee of the kiosk 100, as shown, for example, in FIG. 1C, where alignment is shown with a horizontal dashed two-headed arrow 162. The present invention solves the government regulations compliance problem by providing a physical interface that automatically adjusts to the eye level of the subject to be serviced. At this point and in this manner, the kiosk 100 is made more user-friendly to the enrollee, and the various input and output devices of the kiosk 100 are provided at an appropriate height for users of heights between about 3 feet (0.91 m) and 7 feet (2.13 m) or higher, including seated and wheel-chair bound users.

The right section 104 includes a smartcard reader 120. The operator or enrollee may be prompted (using audio and/or visual prompts) to produce a smartcard which is inserted into a slot 122 of the smartcard reader 120. The smartcard reader may also include a contactless surface configured to interact with the smartcard without requiring physical insertion contact with the smartcard, i.e., the smartcard reader 120 may be contactless.

A multi-capability card that has several storage compartments (silos) and has the capacity to store enrollment information pertaining to more than one user, while keeping the information pertaining to different users separate from one another, such that a user may only access his or her own information is disclosed in U.S. Pat. App. Pub. No. 2011/0178930, the disclosure of which is hereby incorporated by reference herein in its entirety. Systems and methods for generation, management, and use of personal identification tokens for storing information in a secure electronic format for use in various interactions are disclosed in U.S. Pat. No. 7,278,026, the disclosure of which is hereby incorporated by reference herein in its entirety.

An operator that is present at the kiosk 100 location is required to insert a smartcard containing credentials that must be verified to ensure the validity of the smartcard. The operator identification is also checked against an operator revocation list to ensure that the operator is current and valid. The operator must authenticate the session by using a PIN number or fingerprint or both to confirm that he or she is the rightful owner of the smartcard. For the case of remotely-assisted enrollment (i.e., remote identity proofing), the operator at the remote location would also have to use a smartcard and authenticate in a similar manner.

Once the operator inserts the smartcard into the slot 122 and is authenticated, a processor of the kiosk 100 makes a determination as to what kind of a user the authenticated cardholder is. Generally, there are four types of users: (1) an enrollee, (2) an operator, (3) an operator with maintenance privileges, and (4) a supervisor with override privileges. Users with different access have different levels of access to the system as will be discussed in further detail below. The present invention solves the problem related to operator maintenance of the kiosk 100 without compromising the security of the data being collected by ranking the quality of input and presenting information about the quality of the input to the operator that allows the operator to identify problems with, for example, a dirty sensor but without giving the operator access to the personal identity data itself.

If the smartcard is removed from the smartcard reader slot 122, or, in contactless systems, if the smartcard is removed a predetermined distance away from the smartcard reader 120, the kiosk 100 may be configured to turn on a secure screensaver and halt the enrollment session until the smartcard is returned. If the smartcard that is subsequently placed into the smartcard reader slot 122 or, in contactless systems engaged with the smartcard reader 120, is the same smartcard that was used immediately before it was removed, the processor may return the enrollment session back to the last completed step of the enrollment session. Thus, the enrollee is not required to repeat any of the steps that were previously completed. Thus, if the enrollee's face image, iris images, and fingerprints have already been collected, the enrollee will not be required to repeat the steps of collecting that data. This is particularly useful in cases where the enrollee and/or the operator have a question or concern about a particular enrollment step that they cannot figure out without assistance. This may happen if there is a unique circumstance that needs a supervisor's attention. The kiosk 100 according to the present invention allows a halt or pause to the enrollment session to receive proper guidance regarding any issue from a remote operator or locally present supervisor. The enrollee is then allowed to return back to the point where the enrollee left off without potential compromise to the collected data while the kiosk 100 is left unattended. If the kiosk 100 is being operated in a remote supervision mode, a smartcard used at the remote location can substitute for the use of the kiosk smartcard reader 120.

The kiosk 100 does not depend on a centralized server verification of the data present on the smartcard or any other enrolled data. Any information that needs to be verified is present on the smartcard, and the processor of the kiosk 100 is configured to verify this data without requiring centralized server feedback. This greatly enhances the usefulness and applicability of the kiosk 100 because even if centralized servers crash or are not operating, the kiosk 100 may still be used to perform enrollment. In cases of emergency, even the most powerful servers tend to crash due to volume of calls and inquiries. Moreover, even if such servers do not crash, the amount of time it requires to receive any sort of a response from the server in emergencies is increased to an unreasonable duration, generally several hours. The entire biometric enrollment session may be completed without requiring any server feedback or verification. Moreover, the time it takes to complete the enrollment session is independent of any server issues or emergencies. Thus, the kiosk 100 is a secure system, the operation of which is not affected by server outages or emergencies.

The kiosk 100 includes an internal processor, a power supply and power distribution systems, where the USB power distribution and cable harnesses complete the core unit.

The kiosk 100 includes a scene camera 123. The Federal Government requires identity proofing through the enrollment process with operator assistance. By using the scene camera 123 of the present invention, the operator of the device can attest to the integrity of the enrollment process of each enrollee. The scene camera 123 gives the operator of the kiosk 100 the ability to perform an operator assisted/driven enrollment from a remote or centralized location, which reduces manpower and therefore cost and increases efficiencies. The scene camera also enables the kiosk 100 to be used in a self-service mode with no operator supervision. In this case, the video of the transaction provides a means for post transaction video review in real time replay or fast time replay and for transaction audit. This further reduces the operator labor cost per enrollment transaction. Referring now to FIG. 1E, the scene camera 123 monitors and records the area surrounding the kiosk 100. In particular, the scene camera 123 focuses on access to the sensors located on the main module 102 as well as the right section 104 and left section 106. The scene camera 123 monitors access to the smartcard reader 120, credit-card sized document reader 140, single-side document scanner 142, right fingerprint sensor 134, left fingerprint sensor 136, keyboard 146, backlit signature capture device 148, and dual-side document scanner 144. The scene camera 123 monitors who has access to these and other components of the kiosk 100 to ensure that the enrollee is entering his or her information and not someone else's. Data recorded by the scene camera 123 can be appended to the enrollment record and stored off-site to maximize data integrity thus eliminating kiosk stored data security risks. When the kiosk 100 is not performing an enrollment, the scene camera 123 may be in surveillance mode recording a video of the area surrounding the kiosk 100.

As shown in FIG. 1E a scene camera 123 may be used to capture the image of the enrollee and the room or background surrounding the user 200 of the kiosk 100. The scene camera 123 allows an operator of the kiosk 100 to maintain integrity of the entire biometric enrollment process by ensuring that no one in the area surrounding the enrollee is substituting their biometric information for the person having, as for example a driver's license that is used to identify the enrollee. The scene camera helps to address and eliminate the problem of switching and/or fraud in the enrolment process by continuously recording the area surrounding the kiosk 100. The video of each enrollment session is retained as part of the transaction record to facilitate transaction audits as required.

The main module 102 includes a face camera 124 that acquires an image of the face of the enrollee. The enrollee may be prompted to look into the face camera 124 to obtain the enrollee's facial image. Once the enrollee gets to the face image capturing step, the enrollee clicks the appropriate prompt that schedules the face camera 124 to acquire an image of the face. Generally, after the enrollee clicks the prompt, the enrollee is given a predetermined amount of time—which may be a few seconds—to adjust his position relative to the face camera 124. The face camera 124 takes a predetermined number of images, which may be 60 or more images, from a single prompt by the user. The processor then selects a predetermined number of best quality images to be used for the enrollment process. The processor may select three best compliant images for processing and storage. The enrollee or an operator may then select one of the best quality compliant images selected by the processor for the enrollment process. In another aspect, the processor may select one image to be used for the enrollment process. The face camera 124 is configured to acquire images of the face of the enrollee even if the enrollee is moving, not centered side to side within the frame of the camera or not optimally located in distance from camera to enrollee. The processor includes a data storage area for storing, for example, gallery images of enrollees. If a gallery images are available, then the processor of the kiosk 100 performs a biometric match to confirm that there is no substitution or imposter, which provides added security.

If none of the images acquired by the face camera 124 are compliant or acceptable, the enrollment kiosk will not capture (i.e., use for the enrollment process) images until presented with a proper frontal image of the enrollee. This is an automated process. According to another aspect, if the enrollee does not like the acquired image or images, the enrollee may prompt the kiosk 100 to acquire another set of images with the face camera 124.

The present invention solves the problem associated with shadows in images that degrade the quality of the images obtained by image capture devices of the present invention by utilizing novel lighting and automatically ranking images based on image quality characteristics. The kiosk 100 of the present invention may perform the following functions: find the face of the person to be enrolled, divide the image into quadrants, identify and adjust shadows in the image, identify and adjust saturation levels in the image, make adjustments to the lighting by utilizing dynamic feedback, which may include changes to intensity.

The face camera 124 is positioned at eye height of the enrollee regardless of the enrollee's height. The processor may automatically adjust the axial position of the main module such that the face camera 124 is at eye height of the enrollee. In another aspect, the enrollee or the operator may use the height adjustment keys 152 or height/volume adjustment keys 154 to manually adjust the axial position of the main module. The height adjustment keys 154 may also be used to adjust the volume of the voice prompts of the kiosk 100. The height/volume adjustment keys 154 are positioned such that an operator does not have to come into close physically proximity or contact of the enrollee to adjust the position of the main module 102, making the enrollment process more comfortable and private. Because the face camera 124 is positioned at eye height of the enrollee, the enrollee does not have to look up or down at the face camera 124, which may cause image distortion, but instead can look straight at the camera, resulting in the highest quality of images for both printing and biometric matching.

The face camera 124 may be any suitable biometric face camera and lens combination including high resolution. The resolution of the face camera 124 may be between about 1.2 and about 12 or higher megapixels. The face camera 124 ensures a wide field of view for easy and flexible capture and higher than 120 pixels between the eyes resolution. The enrollee may stand at a distance of about 75 cm from the face camera 126. In another aspect, the enrollee may stand at a distance of about 50 to about 120 cm from the camera. Capture distance is dependent on camera and lens configuration selection to meet customer or environmental requirements.

Vision processing software image quality checking ensures face recognition and ISO/IEC and ICAO compliant images every time. This provides high accuracy face and eye finding and the ability to measure pose angle (with a threshold of ±5 degrees) and a check of the illumination on the face and a check for background consistency and background shadows. Vision processing software provides image centering, scaling, cropping and checking of image quality and the compression for storage. Illumination checking includes hot spots, glare and shadows on the face. Subsecond feedback to the enrollee assists the enrollee in properly positioning himself or herself and prompts the enrollee to remove clothing or glasses that may make the face image unsuitable. Since the camera is taking many images during this process, the software can select the best compliant image for processing and storage.

In one embodiment of the present invention, the facial image captured by the face camera 124 is a multi megapixel, International Civil Aviation Organization (ICAO) type II or type III, color image. The face camera 124 may also capture, several seconds, for example 2-3 seconds, of full motion video, which results in about 60-90 images. Utilizing the software of the present invention, the images are automatically cropped, landmarks are set, each image is analyzed, scored and ranked, landmarks such as eye sockets are identified, facial features are identified, and each image is scored to determine the best frontal image. The images are ranked, the top three images are autocorrected to reduce or eliminate features such as artifacts or shadows. Optionally, the person being enrolled or the operator may be given a choice to select from the top ranked images based on their personal preferences.

The face camera 124 includes lighting units 125 attached to the right end 110 and left end 112 of the main module 102. The lighting units 125 adjust the lighting intensity on the face of the enrollee to ensure well lit face images without saturation for changing ambient lighting conditions and skin tones. The lighting units 125 may be LED lights that allow for optimal maintenance of white balance in the captured images throughout the life of the units over time.

The main module 102 includes a dual iris camera 126 for acquiring images of the right and left irises of the enrollee at a short distance between 12 and 16 inches. The enrollees position themselves so that they see their eyes in the mirrored portion of the iris capture unit of the kiosk 100 for this step. The enrollee is prompted to move closer or move further away from the dual iris camera 126 if needed. The dual iris camera 126 includes a position indicator 132 that changes color depending on the position of the enrollee relative to the iris camera 126. If the indicator 132 is blue, the enrollee is too far from the dual iris camera 126 and needs to move forward. If the indicator 132 is red, the enrollee is too close to the dual iris camera 126 and needs to step back. If the enrollee is at an optimal position relative to the dual iris camera 126, the indicator turns green. The kiosk 100 also provides audio clues through a speaker (not shown) or headphones connected via the headphone jack 155 shown in FIG. 1A regarding the enrollee's position relative to the dual iris camera 126. The kiosk 100 also provides on-screen indications regarding the enrollee's position, including written instructions and a color grid.

The dual iris camera 126 is activated by a prompt on the monitor 118 of the kiosk main module 102, which causes the main module 102, along with the dual iris camera 126, to move to an appropriate location which is optimal for each person being enrolled. The dual iris camera 126 continuously takes images of the right and left iris of the enrollee until a compliant image is acquired, providing a fast and accurate dual iris capture. The kiosk 100 may utilize a pair of iris cameras or a single camera that uses software to process image data into the desired format. Referring now to FIG. 1B, the dual iris camera 126 also includes a screen 158 that allows the enrollee to see a reflection or image of their eyes, which also assists the enrollees with properly positioning themselves and with acquiring compliant iris images. Images are not acquired if positioning or eye quality metrics are not met. As for example, recent National Institute of Standards and Technology (NIST) requirements established for Iris capture.

The main module 102 includes a right fingerprint sensor 134 and a left fingerprint sensor 136. The right fingerprint sensor 134 is separated from the left fingerprint sensor 136 such that it makes it very difficult and/or uncomfortable for the enrollee to cross hands and enroll his left fingerprints with the right fingerprint sensor 134 and his right fingerprints with the left fingerprint sensor 136. The design on the right fingerprint sensor 134 and the left fingerprint sensor 136, and their positions relative to one another is ergonomic, making it comfortable and instinctive to enroll the right fingerprints with the right fingerprint sensor 134 and the left fingerprint with the left fingerprint sensor 136. The left fingerprint sensor may be angled towards the left side away from the main module 102 and the right fingerprint sensor may be towards the right side away from the main module 102 to prevent the possibility of hand crossing. This hand crossing would be attempted to circumvent adjudication processing such as fingerprint background checks or duplicate enrollee (fraud) checks. This eliminates the problem that an inattentive operator may not notice that the enrollee crossed his hands. Moreover, this eliminates the problem that the enrollee inadvertently enrolls his right fingerprints as the left and his left fingerprints as the right. Providing two fingerprint sensors instead of one also increases the accuracy of the data collection as it ensures that the enrollee enrolls the correct fingerprints when prompted. Since the enrollee is prompted to enroll both his right and left fingerprints simultaneously, this prevents the problem commonly encountered with systems employing only one fingerprint sensor that the enrollee enrolls the right fingerprints when prompted to enroll the left fingerprints and vice versa. The right fingerprint sensor 134 and the left fingerprint sensor 136 are separated, on average, by a distance of about 17-19 inches (0.43-0.48 m).

The enrollee may be prompted to enroll his fingerprints. The processor is configured to reposition the axial position of the main module 102 to accommodate each enrollee in order to optimize fingerprint capture in an automated fashion. The right and left fingerprint sensors 134 and 136 are configured to collect one right and one left fingerprint at a time. Collecting only one right and/or one left fingerprint at a time increases the accuracy and the level of detail and reduces smear and residual fingerprints provided by previous fingerprint scans.

In another aspect, the right and left fingerprint sensors 134 and 136 may also be configured to collect two, three, four, or five right and left fingerprints at a time. The processor collects the fingerprint data and provides a feedback screen on the monitor 118 indicating whether fingerprints of acceptable quality have been collected. The fingerprints may be assigned the rating excellent (1), very good (2), good (3) or not acceptable as per applicable fingerprint quality algorithms such as NIST NIFQ standards. Any fingerprint that is not acceptable needs to be collected again. Re-enrolling a fingerprint that has been previously rated as excellent, very good, or good, the processor saves the previously collected fingerprint until another acceptable fingerprint is enrolled. Alternatively, the processor may save the previously collected fingerprint until a higher rated fingerprint is acquired.

The main module 102 may include only one fingerprint sensor, which may be any commercially available fingerprint sensor. The only one fingerprint sensor may be a 4-4-2 fingerprint capture device that captures four fingers of the left hand simultaneously followed by four fingers of the right hand simultaneously and then both thumbs simultaneously.

The enrollee or the operator is allowed to input information related to the inability of capturing fingerprints (one or more fingers). For example, if one of the needed fingers is amputated, has a bandage on it, or if the fingerprints may not be obtained for other reasons, including that the enrollee has substandard fingerprints, which is a common issue with enrollees that work in construction. These annotations, amputated, unobtainable print or damaged/bandaged. are available for each required capture and made part of the enrollment record.

The right section 104 also includes a credit-card sized document reader 140 for collecting information from documents that have the dimensions of a credit card (known as an ID-1 size document), including state identification cards and driver's licenses. The credit-card sized document (with a size of about 54 by 86 mm) is inserted into the slot 138. The processor scans both sides of the credit-card sized document and collects all the information stored on it. For example, if the document is a state driver's license, the processor collects information from the front and back of the card, including the security features and the enrollee's picture. This eliminates the need to manually drag the enrollee's picture into a small space reserved for the picture, which increases accuracy and ease of use.

Moreover, the processor automatically checks authenticity of the credit-card sized document such as a state driver's license, which significantly increases security. At airports, the security personnel generally shine infra-red light at state identification cards and driver's licenses to determine authenticity. However, usually, the security personnel is only closely familiar with the driver's licenses and identification cards of a handful of states, meaning that they might be guessing as to the authenticity of other documents. This is because different states have different security features; moreover, the security features may change. It is very difficult, if not impossible, for an individual to remember which security features each state's identifying documents have. Moreover, it is nearly impossible for an individual to keep up with the changes in security documents. Further, the security personnel is only able to, on average, check for one or two security feature, while state identification cards and driver's licenses are usually equipped with a plurality of such features. This leads to security issues at airports because the personnel may be letting people through with non-authentic documents. The kiosk 100 of the present invention eliminates this issue. Security features of the identifying documents of all states are pre-loaded into the software. The processor 100 then simply checks all the security features present on the identifying document to the list of security features that has been pre-loaded onto the software. Moreover, if there is a security feature update for certain state's identifying document, the software is updated to reflect the change. Thus, the credit-card sized document reader 140 completely eliminates the human factor in checking the authenticity of identifying documents by checking all the security features simultaneously and keeping up with any security feature updates. The processor retains images of the front, back and front under infra-red light as part of the enrollment record. Automated document authentication enables remote supervision of a biometric enrollment as the need for visual inspection of breeder documents is reduced or eliminated.

The right section 104 also includes a document scanner 142. The document scanner 142 scans one side of a document that is placed inside it. The document scanner 142 scans documents such as passports known as ID-2 sized documents and other documents whose nature makes it difficult or impossible to pass through a two-sided scanner. The document scanner 142 also scans documents that are too fragile to pass through a two-sided scanner. The document scanner 142 can be secured in the left section 106 and presented at a suitable height for easy operation for all users. The document scanner 142 may be 400 dpi with ePassport chip reading capability.

The left section 106 includes a dual-side document scanner 144. The enrollee may insert documents having a width of 8.5 inches (0.22 m) or smaller and any length into the dual-side document scanner 144. The dual-side document scanner 144 allows for scanning of documents that do not meet letter standard, which are difficult and time-consuming to scan with a flatbed scanner. Additionally, the dual-side document scanner 144 allows the document to pass through it, which allows for the dual-side document scanner 144 to remain compact.

The main module 102 also includes a keyboard 146 that allows the enrollee or the operator to manually enter any required information, including the enrollee's name, if necessary, or reasons why certain data cannot be collected. As shown, the keyboard 146 is a physical keyboard integrated into the main module 102. The keyboard may also be a virtual keyboard provided on the touchscreen 118. The kiosk 100 may also include both the keyboard 146 and a a virtual keyboard provided on the touchscreen 118. For example, it may be required that additional enrollee demographic or biographic data is required. This information may be entered by the enrollee or operator.

The main module 102 includes a backlit signature capture device 148 that is provided with a stylus 150. At the end of the biometric enrollment process, a notice appears on the screen 118 prompting the enrollee to provide his or her signature on the backlit signature capture device 148 with the stylus 150. The notice may comply with any notice requirements set by a specific state or customer and may generally include an attestation as to the accuracy of the provided information and notice regarding penalties, including criminal penalties, for providing false information. The kiosk software checks to determine whether the acquired signature is clear and within the predetermined requirements. The signature acquired by the backlit signature capture device 148 may also be used for signature biometric enrollment and verification. At the end of the process, the enrollee may be prompted by the touchscreen 118 to indicate completion of the process by pressing an appropriate field on the touchscreen 118. The entire process may be completed, for example, in about one minute and 30 seconds.

Figure 1A:
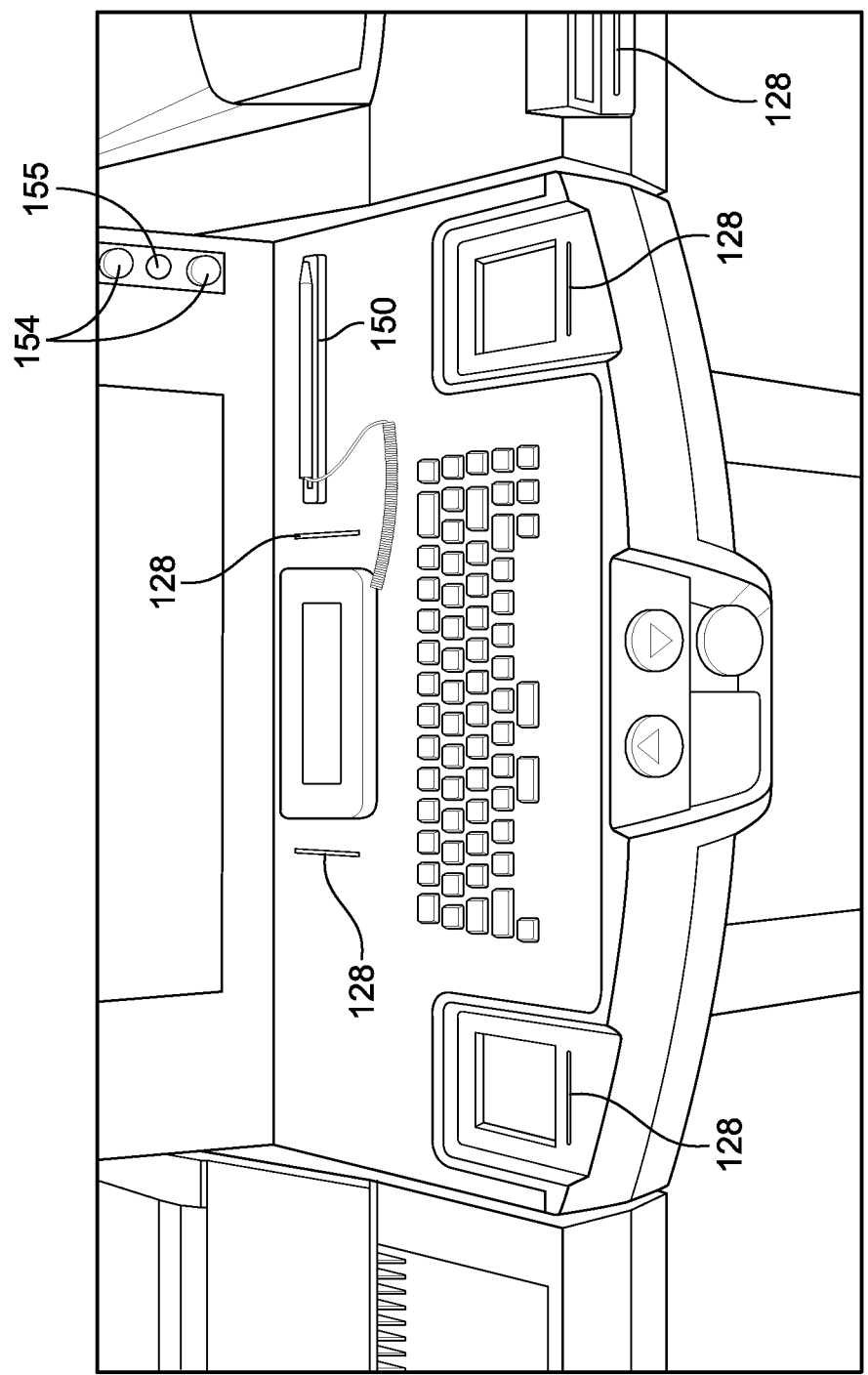
FIG. 1A illustrates a close-up view of a user interface of the kiosk of FIG. 1.
Figure 1B:
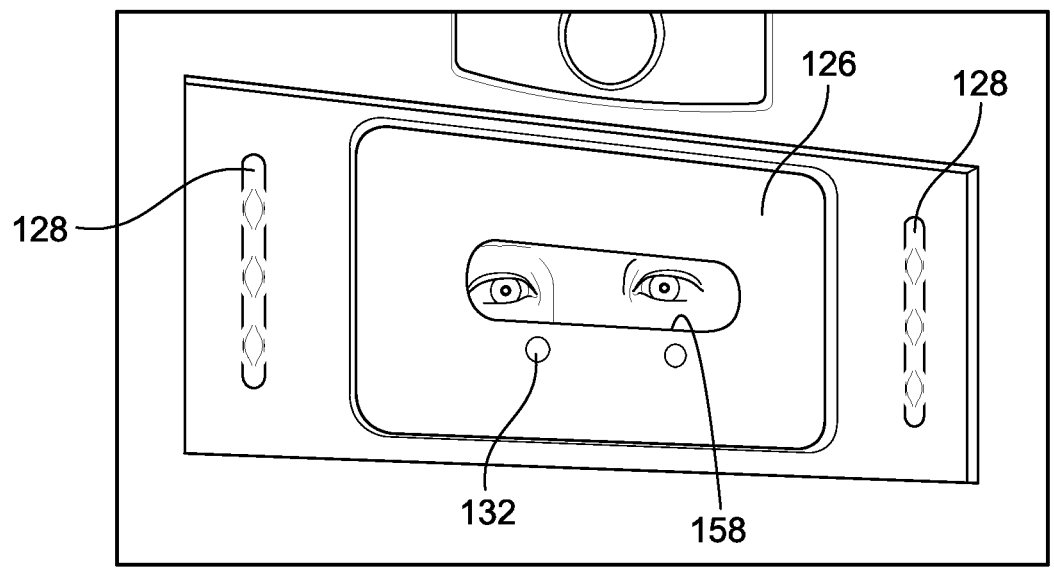
FIG. 1B illustrates an iris camera sensor of the kiosk of FIG. 1.

Referring now to FIGS. 1 and 1A, lighted guiding indicators 128 controlled by the processor are provided proximate the smartcard reader 120, the credit card sized document scanner 140, the single side document scanner 142, the right and left fingerprint sensors 134 and 136, the backlit signature capture device 148, and the dual side document scanner. The lighted guiding indicator 128 may be a green, red, blue, yellow, or any other color LED. The lighted guiding indicator 128 is configured to light up before the enrollee is prompted to interact with a particular component of the kiosk 100 and during any such interaction. For example, the lighted guiding indicator 128 proximate the right and left fingerprint sensors 134 and 136 illuminate when it is time for the enrollee to place his or her fingerprints onto the respective scanner. Remote operator assistance is also provided. Provision of this service in selected languages is provided, if required.

The lighted guiding indicator 128 is configured to emit constant light. Alternatively, the lighted guiding indicator 128 is configured to blink at constant predetermined time intervals. The lighted guiding indicator 128 acts as a visual cue and is configured to attract the enrollee and guide the enrollee to interact with an appropriate component of the kiosk 100.

The main module 102 includes an emergency stop button 156 that allows the enrollee or the operator to stop the enrollment process at any desired moment in time. The kiosk 100 may include a microphone (not shown). Thus, the enrollee may be required to provide a voice sample for further authenticity validation of the enrollee's information, biometric verification and identification of the enrollee. The voice sample also helps to prevent fraudulent enrollments and/or mistaken duplication of enrollment by the enrollee. For some customer applications, some of the capabilities may not be required and so the kiosk 100 may be configured with those adjustments. The kiosk 100 includes only two external cords—a power cord and a network cord, which greatly enhances the ease of transportability of the kiosk 100 since only two cords need to be unplugged. The kiosk 100 has the following approximate dimensions: height—90 inches (2.29 m), depth—20 inches (0.51 m), width—42 inches (1.07 m). Thus, the kiosk 100 can easily fit in most standard elevators and doors. Thus embodiment of the kiosk 100 is totally self-contained and supporting.

The main module 102 may be configured to return back to a home or default position after the end of each biometric enrollment session. Thus, when the enrollee ends the biometric enrollment session by performing all the steps or if the predetermined amount of time for data collection after the smartcard has been removed is over, the main module 102 adjusts to a position that has been configured as the home position. The home position is configured individually for each customer. As such, the home position may be determined and preset based on average height data in the region where the biometric enrollment kiosk 100 is located. The home position may be adjusted by making changes to the software on a remote server.

Accessibility to public services for the disabled is the law and is subject to government regulations. In the United Kingdom, it is governed by the Equality Act 2010 and in the United States by ADA 1991/2010. The highlights of the accessibility design are: height adjustment of the kiosk to accommodate people in wheelchairs; space under tray provided to allow for wheel chair maneuvering and positioning; all devices are within the reach requirements for accessibility; headphone jack with volume adjustment is provided for hearing and visibly impaired; screen designs are in accordance with accessibility best practices; and provision is made to support other languages for the display and the audio.

Internal Sensors

The kiosk 100 is equipped with a number of internal sensors, which include, but are not limited to, intrusion detectors, temperature detectors, a humidity sensor, and an accelerometer/vibration sensor. In brief, the purpose of the various sensors is twofold: first, to prevent any unauthorized access to the kiosk internals, which could conceivably result in compromised data and integrity of the system and second, to monitor the environmental and physical health of the system.

Various access panels of the kiosk 100 are equipped with intrusion detectors. As soon as any one of these panels is removed in order to gain access to the internal components, a signal is generated that is monitored by the computer. Appropriate action is taken to safeguard the kiosk, integrity which may include recording time, date and location of the specific detector, sounding remote alarms, etc.

The kiosk 100 may include 4 temperature detectors, one located in each main part of the kiosk 100. The main module 102, the right section 104, the left section 106, and the lift unit 108 all have a temperature sensor. These temperature sensors are monitored by the processor, which is configured to take appropriate action, such as shutting down certain electronics, raising external alarms, etc.

A humidity sensor is located in the lift unit 108. If humidity rises above a certain predetermined level (typically, 85-90% relative humidity), an alarm is generated causing the processor to shut down the system.

The accelerometer/vibration sensor is incorporated in the main module 102. This sensor is configured to detect any brute force applied to the kiosk 100 in order to gain access to it or to vandalize the equipment. The processor monitors the output of this sensor and is configured to sound an external alarm, if necessary.

Maintenance

This kiosk 100 is designed for heavy use in public spaces and as such it has to be durable and reliable. One of the main problems encountered by any enrollment systems in public places is component theft and destruction. To achieve durability, front wear surfaces are aluminum with powder coat paint and hardened/impact plastics; the lights 125 and 128 are long life LED lights so there are no light bulbs to worry about; the scene camera 123, the face camera 124, and the dual iris camera 126 are placed behind protective glass; the keyboard 146 is industrial grade; the dual-side document scanner 144 is industrial grade straight through paper pass with easy document extraction if a paper jam occurs; the monitor 118 and the card readers 120 and 140 are kiosk grade; and the right and left fingerprint sensors 134 and 136 are best commercial grade and proven reliable in public space use. These components can also be used within Government (United States and other) programs that require certification and approval such as Homeland Security Presidential Directive 12 (HSPD-12), Personal Identity Verification (PIV), PIV-I, First Responder Authentication Credential (FRAC) and United States Department of Defense Common Access Card (DOD CAC).

The only routine maintenance is that the fingerprint platen of the right and left fingerprint sensors 134 and 136 should be wiped clean daily, or more frequently in busy locations.

Figure 1C:
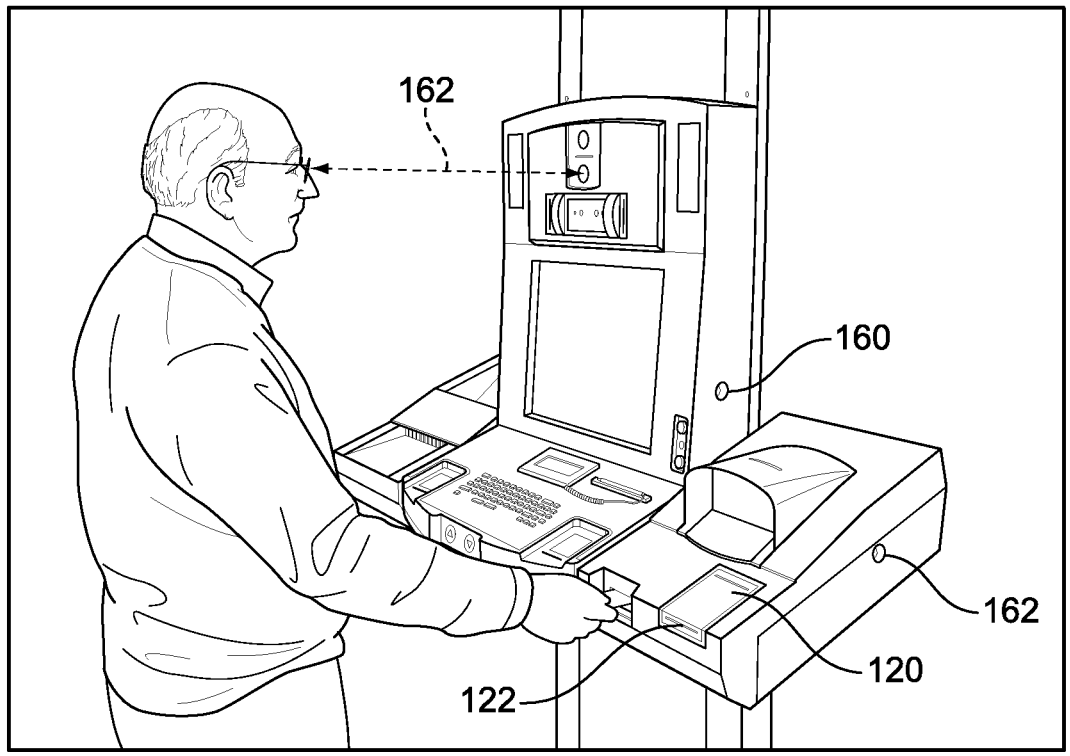
FIG. 1C illustrates a user interacting with the kiosk 100.
Figure 1D:
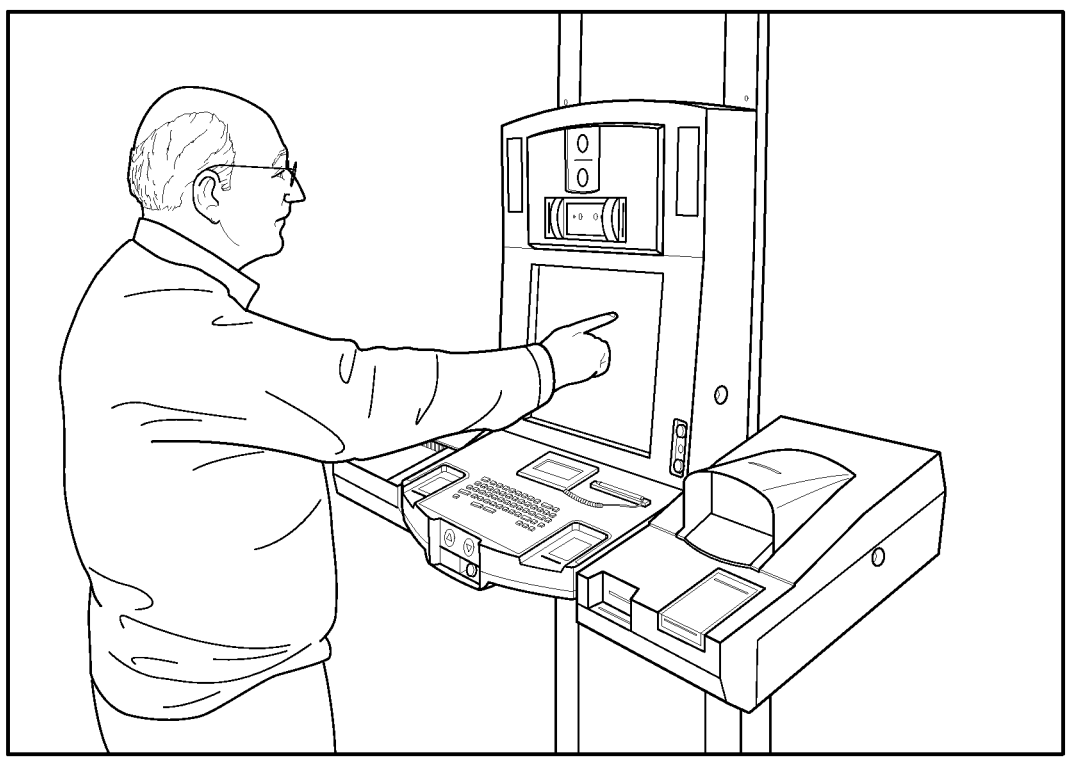
FIG. 1D illustrates a user in a standing position touching a touchscreen of the kiosk of FIG. 1.
Figure 1E:
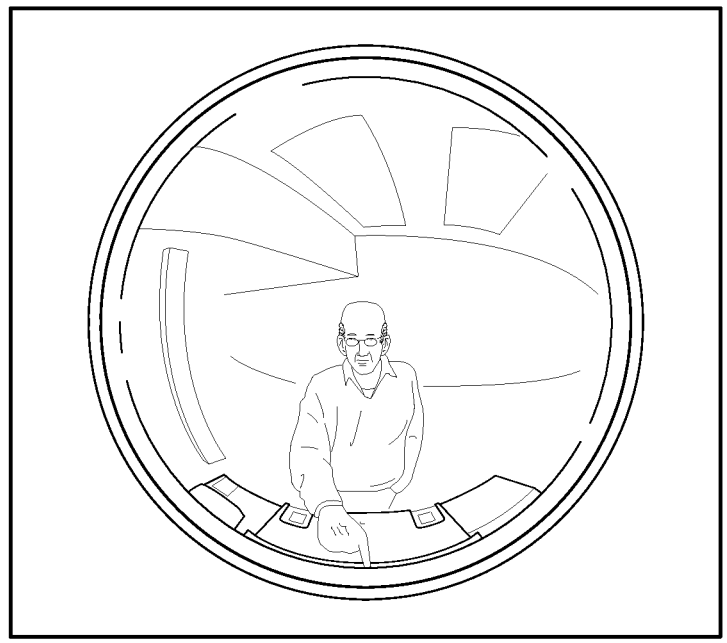
FIG. 1E illustrates the perspective of the scene camera with respect to the user and the kiosk components surrounding the user of FIG. 1D.

Even with highly reliable components, some maintenance will inevitably be required. The kiosk 100 is designed so that all maintenance can be done from the front. Referring now to FIG. 1C, locked access doors locked with locks 160 and 162 open to expose all internal components for maintenance and replacement. The kiosk 100 is equipped with additional security features, wherein each operator must have an appropriate smartcard in order to access the internal components of the kiosk 100. If only the key is inserted into the lock 160 and/or 162, and no smartcard with appropriate access level is inserted into the smartcard reader 120, an alarm will sound. Any operator must have an appropriate access level that is provided on the smartcard. Anyone performing maintenance on the kiosk 100 must have maintenance level access permission. A supervisor might have a smartcard reader with access level that allows the supervisor to skip certain enrollment steps or overwrite certain requirements, if necessary.

Initial installation and unit replacement is designed to be quick and easily done by one or two service technicians. The kiosk 100 is generally shipped as three components, the lift unit 108, the main module 102, and the right section 104 and/or left section 106. Installation steps include: fixing the lift unit 108 to floor or freestanding base; bolt main module 102 to the lift unit 108 (may include 4 bolts); bolt the right section 104 and/or the left section 104 to the right end 110 or the left end 112 of the main module 102 (each connection may include 4 bolts); connect cable connectors for the main module 102 and the right section 104 and left section 106; connect power and network cable to kiosk base; confirm auto power up and operation of the kiosk 100.

Security and Privacy of the Kiosk

There are several distinct layers of security provided for the kiosk 100. These include: the kiosk 100 is located in a secure and trusted facility and in sight of an on-site or remote attendant; the transaction is supervised either locally or remotely so it would be very difficult for collusion or substitution; the scene camera 123 has a wide angle lens so that it can record the full field of view, as shown, in FIG. 1E, from the applicant's face to the main module 102 and its data collection elements (including the keyboard 146, the right and left fingerprint sensors 134 and 136 and the backlit signature capture device 148), to the right section 104 and its elements (smartcard reader 120, credit-card sized document scanner 134, and single-sided document scanner 142) and to the left section 106 and its elements (two-sided document scanner 144) so that there is an audit trail for each enrollment. For dependent or assisted enrollment, a second person may participate and assist with the enrollment, but this process can be monitored remotely so that the remote operator can both assist and assure that the transaction is completed properly. The acquired image quality is checked and where possible the enrollee's identity is confirmed biometrically against existing face and iris images and/or fingerprints; the captured biographical, biometric and breeder document information is retained in encrypted form on the kiosk 100 only as long as it is needed to transmit the encrypted information and receive confirmation of receipt (in fact, each biometric or biographical component is individually encrypted and then the overall transaction file is encrypted before transmission; no personal information is retained on the kiosk after the end of the transaction).

The transaction may be conducted in privacy with full wall plus part length curtain. Transaction data may be visible during the transaction, but is not retained on remote operator station; access to transaction data on servers is controlled to authorized personnel only. Physical tampering with the kiosk 100, such as shaking the kiosk 100 or unauthorized attempt to move or access the kiosk 100, activates an accelerometer which ensures that the tampering is recorded by the scene camera 123 and brings on the remote operator to investigate; and a local audible alarm could be initiated if required.

Certain enrollees, such as, for example, foreign residents or government contractors, may use the kiosk 100 once, or infrequently, so the operation of the kiosk 100 must be simple, intuitive and, to the extent possible, language independent. The kiosk 100 incorporates the written on-screen instructions supported by animation or video. The written on-screen instructions may be written in a number of different languages, including English, French, German, Spanish, Russian, Arabic, Chinese, and others. The kiosk 100 includes guiding light indicators 128 that light up indicating the next device with which the enrollee is supposed to interact. Remote operator assistance may also be provided via the speakers of the kiosk 100. The kiosk 100 is designed for easy ergonomic use independent of body shape or size; user feedback advises the user to make adjustments or retake a photo or biometric capture; and full visibility of the scene and the capture results by the remote operator.

Minimizing the transaction time is very important. To make the process more convenient for the enrollee and the customer, minimum wait time for those waiting to use the device and maximum throughput of each kiosk at peak periods need to be achieved.

In customer trials in Virginia, it was found that a typical enrollment for an application with people that had never seen the kiosk before was between two and three minutes. For these trials, the kiosk 100 was used to read and capture an enrollee's driver's license, capture a passport, capture a facial image, capture both left and right irises, capture two fingerprints and a signature, and write an encrypted XML output to a central data repository. The present invention provides superior performance over the conventional art by efficiently capturing data at each step (for example, instead of positioning a camera manually to properly capture an enrollees face, take one photo and then check to see if it is ok and then take another, the present system allows a wide facial image capture zone, takes many frames, extracts the faces, checks the quality and then selects the best compliant image); and by providing clear and simple transitions between capture steps. The process is aided by graphics and illumination light bar cues.

Transaction Audit Trail

Each enrollment transaction incorporates an audit trail of the captured enrollment information plus related transaction information. For example, enrollment information includes one or more of the following: the face image is cropped and quality checked; iris image of the right and left eye; fingerprints; signature; and copies of scanned documents. Related transaction information includes, for example, one or more of the following: scene camera video of the transaction period; audio record of the transaction; date and time information for each sub transaction and overall transaction time; results of any biometric identity verification matches and quality scores; and any anomalies in the process (e.g., two faces in the enrollment image could suggest an assisted enrollment or an issue).

The data dictionary used in conjunction with the present invention may have, for example, more than 150 data items, so there is sufficient information to do significant analysis. Simple examples might be: if the fingerprint image quality is consistently lower at one location, then is this an indication that the platen is not being cleaned as regularly as needed; and if the transaction times are consistently higher in one location, then is that an indication that renewed on-site or remote operator training may be required.

According to one aspect, biometric capture devices as well as the scanners are controlled by an individual web service. Thus, the web service may act as a processor and may be embedded in the main module 102. The web service allows the devices to be controlled remotely, if necessary for remote assistance or remote maintenance purposes. The use of a web service also allows a particular capture device to be replaced by another unit which may be a different model, and to use exactly the same web service interface. In turn, this means that updating to new devices or changing to different devices is simple and seamless for the kiosk software. Thus, all that is required to replace one capture device with another is to disable the old device and to connect the new one to the web service. Additionally, the web services for all devices follow the National Institute of Standards Specification for Web Service-Biometric Devices. This allows interoperability for changing to any different devices which follow the same standard. This allows a client who purchases a kiosk 100 to keep up with the newest technology in the biometric capture field as it is developed without having to replace the kiosk 100.

The kiosk 100 can be used as an enrollment or capture device through its own web service interface. The kiosk 100 exposes a single web service interface for the kiosk as a single entity. This can be used by any application to control, configure, and operate the kiosk 100, either locally or remotely. This web service can also be integrated into third party applications which may want to use the kiosk 100 as a capture device. Clients can make requests directly to the kiosk 100, and the web service running within the kiosk 100 translates the web service—biometric device requests to and from biometric sensor commands, including the fingerprint sensors 134 and 136, the scanners 140, 142, and 144, and the cameras 123, 124, 126, as well as the signature capture device 148. Thus, the web service performs the functions usually performed by the processor.

The processor is configured to retain data about any biometric enrollment session that has been halted or paused due to smartcard removal for a predetermined period of time, which may be determined by a customer. Certain customers may desire that the processor retains the data for longer periods of time, while others may desire that the processor retains data for only short time periods. These settings may also be changed remotely post-production.

Performance Reporting

Performance reporting is done centrally based on transaction and equipment availability information from each kiosk 100. A generalized reporting tool is provided to allow user defined and ad hoc reports. Typical reports include: transaction reporting for gross transactions in a period, transactions by locations in a period, transactions by time of day by location in a period; steps that had to be redone overall and by location; transaction step times to assess if there are anomalies in the process or the equipment in a location; successful transactions versus abandoned transactions, step at which transaction was abandoned; and equipment unavailable reporting.

As noted above, the rich selection of transaction data allows effective analysis of the information. Generally, the transaction data with the encrypted components still protected is moved to an appropriate database to allow more in depth analysis and reporting.

According to another aspect of the present invention, the kiosk 100 may utilize software that runs on the Microsoft.net framework. The processor of the kiosk 100 is directed toward the collection of personal identity information (PII). The processor of the kiosk 100 is adapted to digitize and protect PII.

Professional Services

The present inventors provide professional services to deliver complete solutions that incorporate the above identified technology. These include business analysis, architecture, design, integration, testing, on-site consulting, training and testing, support and maintenance services. The present inventors support an in-house biometrics lab equipped with test tools and databases that enable timely testing of new biometric technology and performance validation of new releases of biometric engines.

The issue, however, is to have this information readily available to the administrator or data analyst, yet ensure that the protected Personal Identity Information (PII) data stays encrypted. Technically, the encryption is at the object level and thus provides enforced role based access at a fine granularity. The screen shot represented in FIG. 1F shows one view of such data.

Figure 1F:
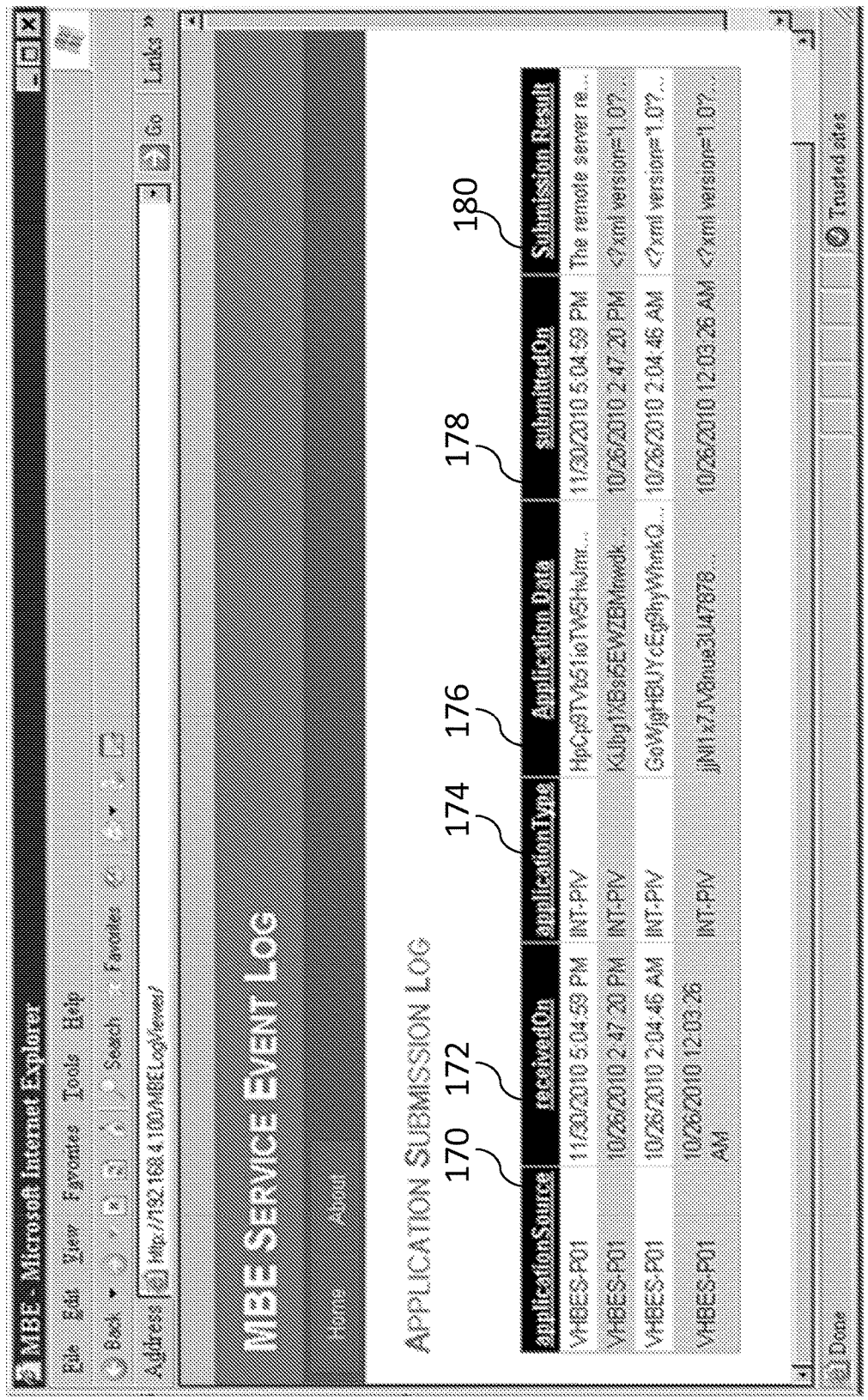
FIG. 1F is a screen shot of an MBE Service Event Log.

The screen shot in FIG. 1F shows the application source in field 170 (the source kiosk, "VHBES-P01" in this example), the date and time received from the source in field 172 ("Oct. 26, 2010 12:03:26 AM" to "Nov. 30, 2010 5:04:59 PM" in this example), the application type in field 174 (for which agency was the information captured, "INT-PIV" in this example), an encrypted representation of the application data in field 176 (for example, "HpCp9TVb51ioTW5HvJmr . . . " in this example), the date and time submitted in field 178 (data can be transmitted to the agency immediately or aggregated and submitted periodically, say daily, again "Oct. 26, 2010 12:03:26 AM" to "Nov. 30, 2010 5:04:59 PM" in this example) and the submission result in field 180 (confirmation of receipt, "<xml version='1.0'? . . . " and "The remote server re . . . " in this example).

The processor is adapted to build an enrollment record with a suitable number of fields, for example, 150 fields used for PII, Maintenance, standards compliance, enrollment authenticity assurance and security. The processor is configured to encrypt information based on assigned roles. For example, the kiosk 100 of the present invention may be given the role of encrypter. That is, the processor of the kiosk 100 may collect and encrypt information into a master record.

Any personal data collected during the enrollment session may be encrypted via Constructive Key Management (CKM) encryption, Extensible Markup Language (XML) encryption, or any other suitable encryption method. U.S. Pat. Nos. 7,974,410, 7,738,660, 7,212,632, 7,079,653, and 5,375,168, the disclosures of which are hereby incorporated by reference herein in their entireties, discuss systems and methods for CKM encryption of sensitive information such that only users with proper credentials are able to access any encrypted information. According to one aspect of the present invention, the processor is configured to generate an XML style sheet. U.S. Pat. Nos. 8,077,870, 7,817,800, 7,095,852, and 6,694,433, the disclosures of which are hereby incorporated by reference herein in their entireties, discuss systems and method for XML encryption.

According to a further aspect of the present invention, the processor may be configured to send the collected personal data to a central processing cloud. The kiosk may be adapted to utilize a web listener, where a user sends a request, and a chain of trust is established between each kiosk, central repository facility and central processor. A web server may be given the role of decrypter. The decrypter may direct storage of data based on rules and may utilize prefiltering to avoid duplications or fraud.

The kiosk according to the present invention prevents excess costs to the enroller sponsoring entity by processing data in a manner that prevents duplication. The present invention allows the owner of the kiosk to protect certain fields of data as demanded (differential role based access control to data content).

Biometrics is about standards. The kiosk 100 is designed to meet the prevailing and applicable biometric, health and safety standards. Examples are: fingerprint standards including FBI PIV-071006, Federal Information Processing Standards (FIPS) 201 and ANSI INCITS-378; face image standards including ANSI INCITS-385 and ICAO ISO/IEC 19794-5; iris standards including ISO/IEC 19794/19785; document scanner/reader standards including International Air Transport Association (IATA): transitional automated ticket (TAT) and Automated Ticket and Boarding Pass (ATB), ICAO 9303 and ISO 14443B; kiosk standards including ADA 1991/2010, Equality Act 2010, Canadian Standards Association (CSA), UL, Federal Communications Commission (FCC) and Conformité Européenne (CE); and data security standards including ANSI X9.69 and ANSI X9.73.

Biometric Enrollment Stations

The present inventors have developed biometric capture stations that are designed to fit the specific requirements of customers that are implementing identity biometric solutions. The form factor differs from application to application to meet the needs for: unattended or attended operation; free standing or mounted on desks or counters; fixed or transportable; mix of biometrics captured (face, fingerprint, iris, signature, and others); mix of peripherals for application (e.g. card readers, passport readers, receipt printers etc.); and accessibility requirements.

Accessible Biometric Enrollment Kiosk—Self Service

Figure 2A:
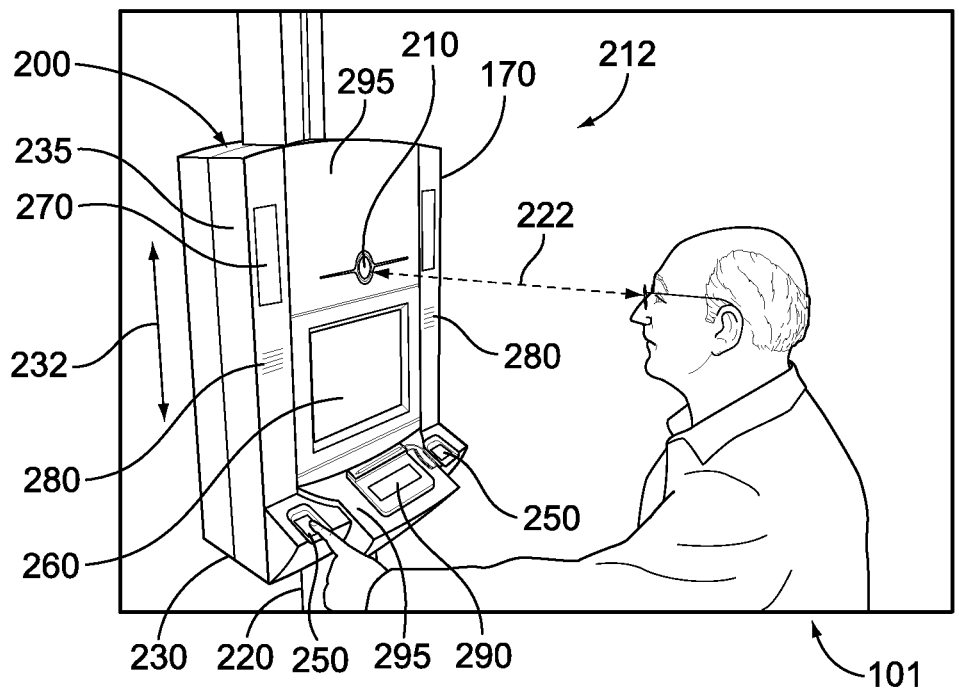
FIG. 2A illustrates a perspective view of a self service accessible biometric enrollment kiosk being accessed by a user who is in a sitting position.

Referring now to FIG. 2A, the self-service enrollment kiosk 200 is designed to meet the accessibility requirements for government regulations compliance including, for example, the handicapped in wheelchairs to very tall applicants. To capture consistently good full frontal face images that are suitable for face recognition with the range of heights from a person in a wheelchair 101 to a very tall person, it is necessary to have the kiosk 200 on a lift pole 220. The kiosk 299 design adjusts the height of the camera 210, the touchscreen monitor 260, the lights 270, peripherals such as a document reader, a fingerprint capture device 250 and/or an electronic signature capture device 290 so that they are both accessible for the full range of heights and positioned for optimal enrollee capture.

The enrollment kiosk 200 shown, for example, in FIG. 2A provides the range of motion required. For each person 101 the camera 210 is aligned automatically with the eyes 212 of the person 101 using the kiosk 200 (alignment shown with a horizontal dashed two-headed arrow 222). This kiosk 200 has been designed to provide straight on capture for users 101 that are as short as 36 inches (0.91 m) and as tall as 6 feet 8 inches (2.03 m). The biometric capture unit 230 including tray 240 of kiosk 200 are adapted to move in a generally vertical direction 232 along lift pole 220. The dimensions of the lift pole 220 may be 3 inches×8 inches×6 feet 6 inches (0.076 m×0.2 m×1.98). The kiosk 200 may also include a support base plate suitable for fixing to floor (not shown) or wall bracket for wall mount (not shown). The biometric capture unit 230 may have the dimensions of about 20 inches (0.51 m) wide×26 inches (0.66 m) high×16 inches (0.41 m) deep (including tray 240). The kiosk 200 as shown includes two fingerprint capture devices 250 on either side of the touchscreen 260, camera 210, lights 270, speakers 280 and a signature pad 290 on the tray 240. On the bottom right of the lift pole 220, there is a power plug (110 v or 220 v) and one RJ45 jack that provides a network connection (not shown). Thus, the kiosk 200 only includes two external cords—a network connection cord and a power plug, which makes it very easy to transport the kiosk 200.

The front tray 240 may be modified according to specific customer requirements. The tray 240 shown in FIG. 2A includes two fingerprint capture devices 250 and an electronic signature capture 290. The two fingerprint sensors 250 are separated from each other by a distance of between about 12-14 inches (0.3-0.36 m) which ensures that the enrollee 101 enrolls the right fingerprints using the right fingerprint sensor and the left fingerprints using the left fingerprint sensors. The fingerprint sensors 250 are configures such that the enrollee captures both left and right fingers at the same time to provide an increased measure of accuracy. This eliminates the problem of "hand-crossing" by an enrollee to fool the system and an operator by providing a left finger for the expected right finger and a right finger for the expected left finger. The fingerprint sensors 250 may also be angled in different directions such that it is very difficult for enrollee 101 to cross his or her hands. The fingerprint sensors 250 may both be angled away from the lift pole 220, i.e., in different directions, with the fingerprint sensor located on the right side being angled towards the positive x-axis and the fingerprint sensor located on the left side being angled towards the negative x-axis.

Figure 3:
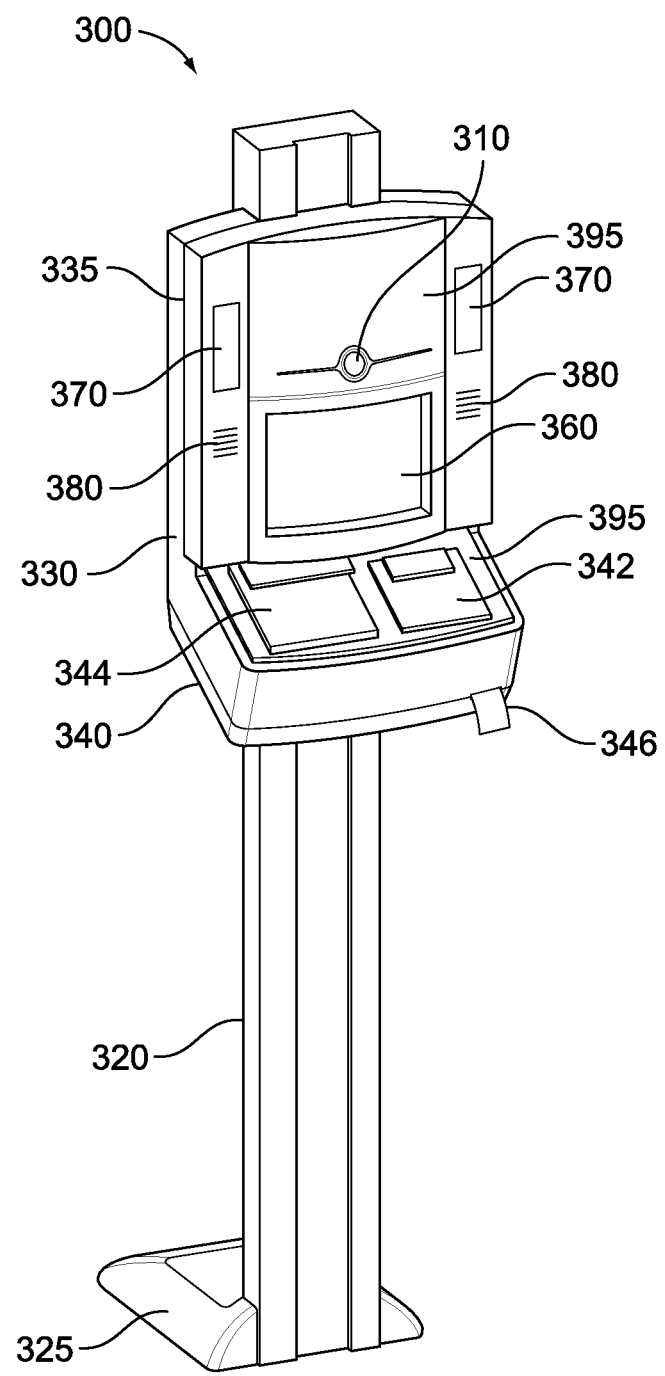
FIG. 3 illustrates a perspective view of a self service accessible biometric enrollment kiosk having an alternate arrangement of input and output devices.

Another configuration is shown in FIG. 3 with a 4-4-2 fingerprint capture device 342, a full page document reader 344 and a receipt printer 346. The kiosk 300 shown in FIG. 3 has a very small foot print that provides great flexibility in locating it either against a wall or as a free standing unit.

Figure 2B:
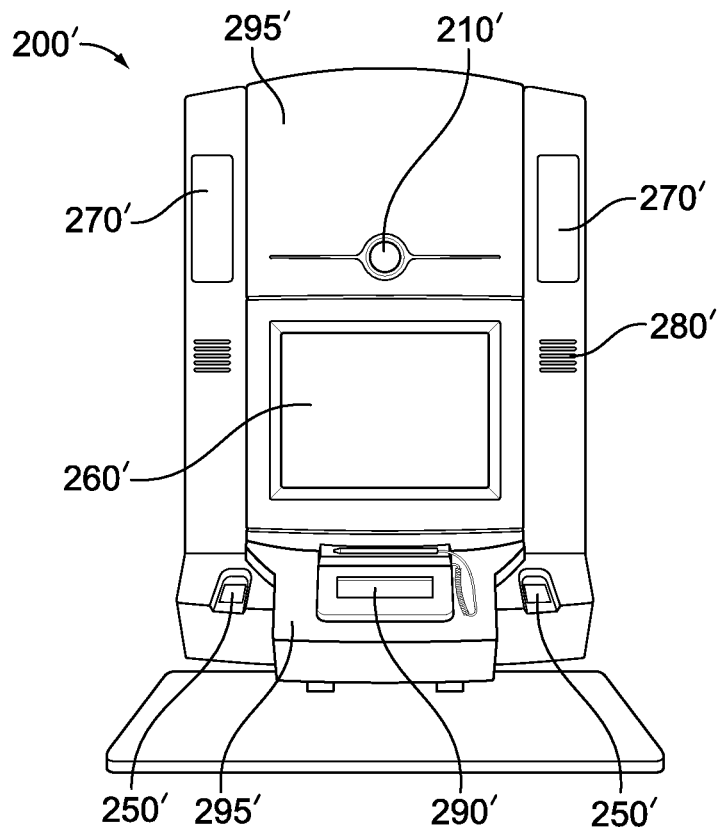
FIG. 2B illustrates a perspective view of a countertop kiosk.

FIG. 2B shows a front view of a kiosk 200' that is configured to stand on a desk or other pedestal. The kiosk 200' includes a camera 210', lights 270', speakers 280', two fingerprint capture devices 250' on either side of the touchscreen 260', a signature pad 290', and a tray 295' which may be made of aluminum or other suitable material. The kiosk 200' is a standalone unit that may be mounted on any elevated surface.

The high resolution biometric camera (e.g. 210, 210', 310) is 3.1 megapixels to ensure a wide field of view for easy and flexible capture and higher than 120 pixels between the eyes resolution. The applicant or enrollee 101 stands approximately 75 cm from the kiosk camera, but may also stand from about 50 cm to about 120 cm away from the kiosk. Alternate cameras from 1.2 to 9 megapixels are available options.

Image quality checking ensures face recognition compliant images every time. This provides high accuracy face and eye finding and the ability to measure pose angle (with a threshold of ±5 degrees) and a check of the illumination on the face and a check for background consistency and background shadows. Vision processing software provides the image centering, scaling, cropping and checking of image quality and the compression for storage. Illumination checking includes hot spots, glare and shadows on the face. Sub-second feedback to the user gets the applicant to position himself or herself properly and to remove headgear or glasses that make the face image unsuitable. Since the camera is taking many images during this process, the software can automatically select the best compliant image for processing and storage.

Lighting (e.g. 270, 270', 370) adjusts the lighting intensity on the face to ensure well lit, face images without over saturation for changing ambient lighting conditions and skin tones. The color touch sensitive monitor (e.g. 260, 260', 360) provides clear user interaction. Cast Aluminum front panel and tray (e.g. 295, 295', 395) provide an attractive appearance and rugged performance for heavy use. Speakers (e.g. 280, 280', 380) are included on each side of the monitor to provide audible and voice cues to the user that are part of the accessibility design.

The kiosk front panel has hinges (e.g. 235, 335) on the side and opens for easy service from the front. This means that the kiosk can be located against a wall or column and still be accessible for service. When the front is opened, kiosk components are surface mounted for easy trouble shooting and fast replacement. Dual locks protect the kiosk from tampering.

The rigid, small footprint kiosk lift (e.g. 220, 320) is easily installed and serviced. The lift moves swiftly and quietly to the desired height to minimize transaction time. The lift includes safety features to ensure that the lift stops and lifts when it comes in contact with an object when travelling down (similar to the operation of an elevator door when closing). The kiosk is self-contained so the only external cabling requirements are power (110 vac, 60 Hz or 220 v 50 Hz) and a network cable, which makes it easy to install and transport.

The kiosk is designed to accommodate changing requirements. The kiosk may be provided with any suitable combination of components in any suitable size or form factor. The top surface of the tray may be made of steel, plastics, or any other suitable material so that it can be readily changed as required.

The user interface is usually customized to the specific application. All installations incorporate graphical and pictorial presentations. If necessary, these can also incorporate a wide range of languages for both the graphics and the audible portion.

As an option, the 4-4-2 fingerprint reader is secured in the kiosk and is presented to the user at a suitable height for easy access (see, e.g. FIGS. 2, 3). This is particularly important as it is very difficult to put sufficient pressure on the reader if the reader is too high for the user's reach. Proper positioning increases quality of capture and speed of capture.

Referring now to FIG. 3, as an option, the receipt printer 346 is a thermal printer that produces a 2" paper receipt. It includes out of paper and low paper detection, receipt not taken detection and a guillotine that may partially cut the receipt (this means that it will not fall on the floor, but will detach easily). Paper roll is 3 inches for longer periods between roll replacements. Paper replacement is through a separate keyed access door under the tray. The printer drops down and the paper is replaced from the side and then the printer is snapped back into position. The printer supports barcode printing and specifically Universal Product Code A (UPC-A), Universal Product Code E (UPC-E), European Article Number 13 (EAN13), Code 39, Interleaved 2 of 5 (ITF) and Codabar.

As an option, an iris camera can be installed above the face camera 210, 210', or 310 of FIG. 2, 2', or 3, respectively, and integrated into the kiosk 200, 200', or 300 respectively. The lift unit 320 allows the iris capture to be optimal for all users.

As an option, a barcode reader can be added either on the front surface of the tray or the side of the kiosk 200, 200' or 300. Other technologies can be integrated to meet the specific application requirements. The kiosks shown in FIGS. 200, 200', and 300 are customizable to specific customer requirements. Additional data collection sensors may be integrated into the kiosks, including a scene camera, document scanners, and identification card and/or smartcard readers.

Biometric Enrollment Kiosk—Attended

Figure 4:
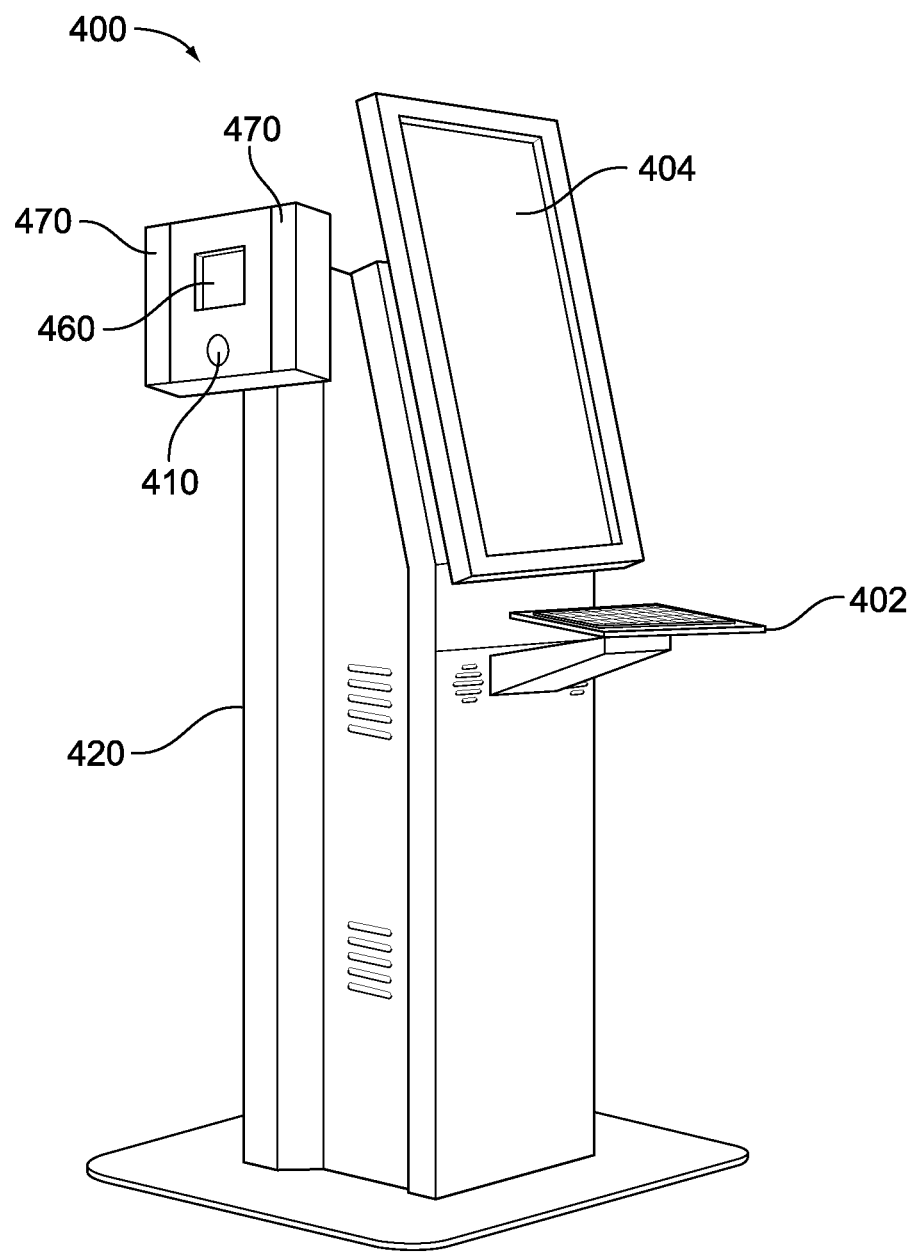
FIG. 4 illustrates a perspective view of an attended biometric enrollment kiosk.

The biometric enrollment kiosk 400 for attended face image capture is shown in FIG. 4. The right side of FIG. 4 shows an example of the workstation for the Officer with both keyboard 402 and touchscreen input and face recognition adjudication 404. The left side of FIG. 4 shows an example of the camera 410, light 470 and display 460 assembly mounted on a lift 420 to provide full frontal face image capture for standing adult subjects.

The device may also be configured as an unattended enrollment kiosk, in which additional capture devices can be added to the camera 410 and light 470 on the lift 420, as required. The kiosk 400 is built on common components that are described in more detail below. As pictured, the camera 410 provides very high resolution and excellent quality images well above the minimum requirements of the standards.

Desktop/Countertop Biometric Enrollment Station

Figure 5A:
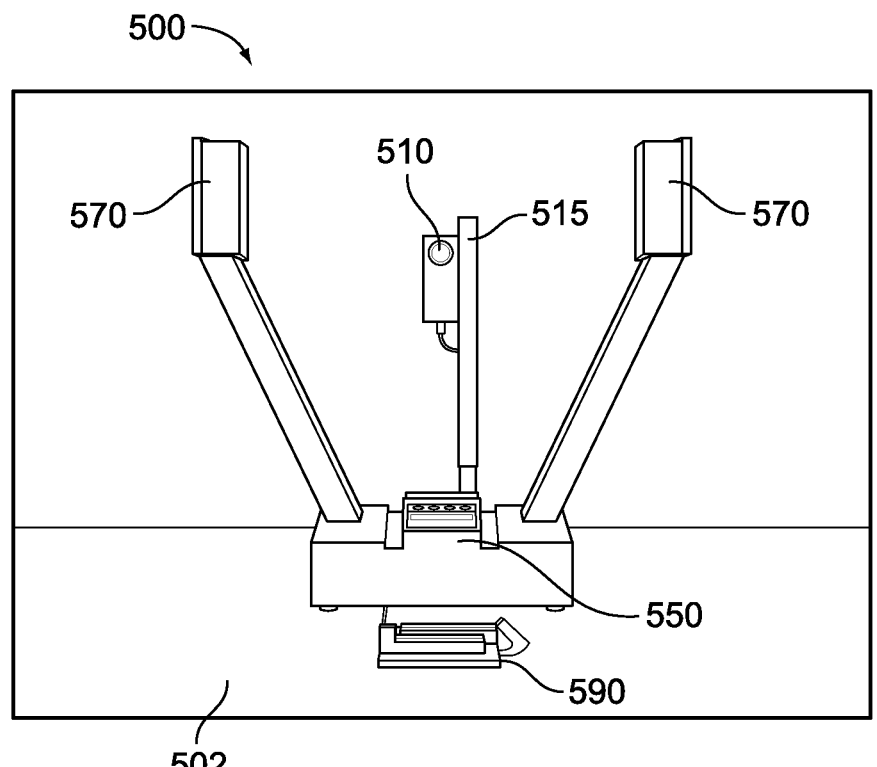
FIG. 5A illustrates a perspective view of a desktop/countertop biometric enrollment station in a deployed position.
Figure 5B:
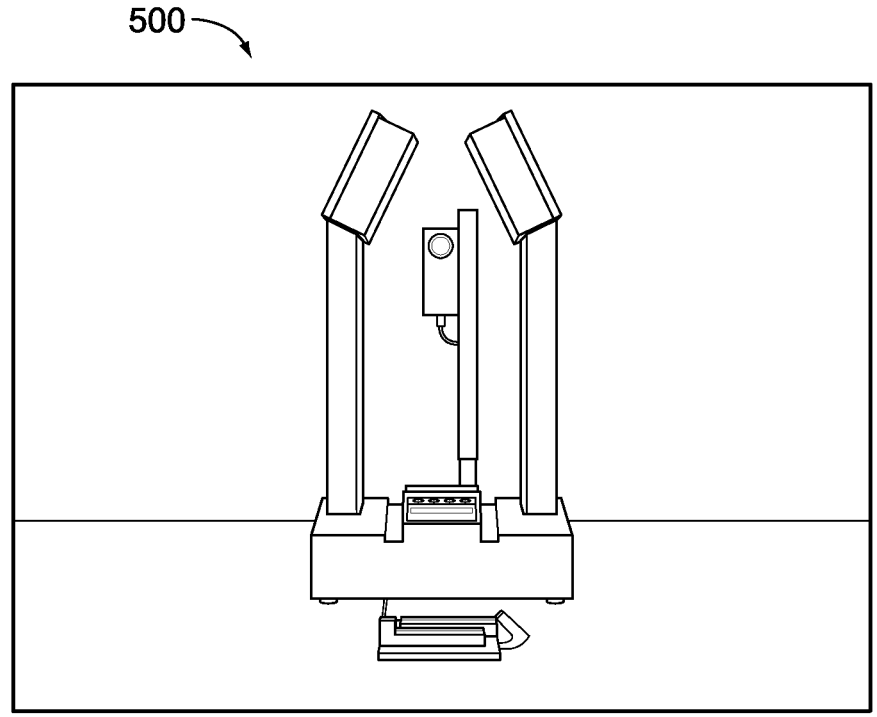
FIG. 5B illustrates a perspective view of the desktop/countertop biometric enrollment station in a stowed or upright position.

The Transportable Enrollment Station (TES) 500 shown, for example, in FIGS. 5A-5B is designed for easy in-field deployment on a table or counter 502. The lights 570 fold into an upright position as shown in FIG. 5B and the unit 500 packs into a hard shell case for easy and safe transport. The unit 500 as shown in FIGS. 5A-5B includes a built in 4-4-2 fingerprint capture device 550 and a tethered electronic signature capture unit 590. This is available with face image capture with smart illumination, face and one or two fingerprint capture and face plus 4-4-2 fingerprint capture. Some deployments incorporate a bar code reader on the camera support 515 to facilitate specific workflows. Some units incorporate an enclosure for the camera 510 to eliminate the opportunity for accidental adjustment of lens settings. The camera 510 can be easily adjusted in height to allow for different mounting heights of the TES. This unit is also constructed for a single man lift and setup, eliminating the need for multi-person transport, setup and operation.

Figure 5C:
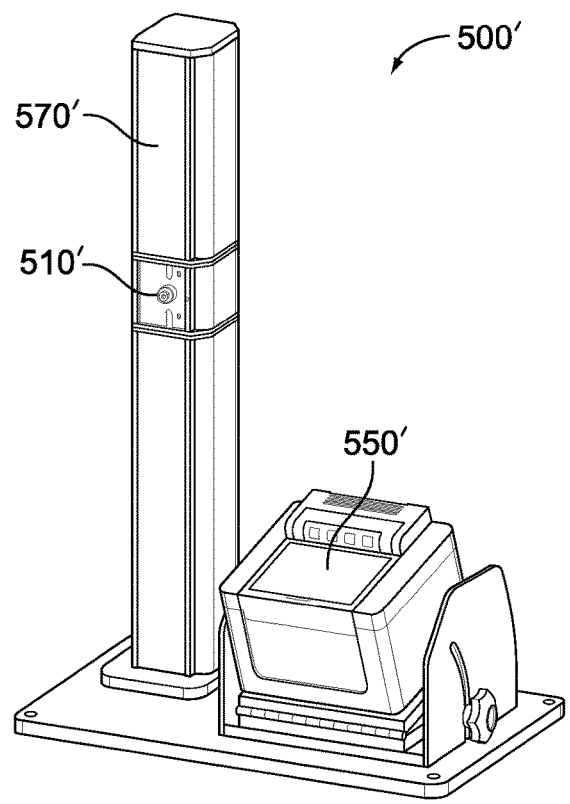
FIG. 5C illustrates a perspective view of another desktop/countertop biometric enrollment station for face, and fingerprint capture.
Figure 5D:
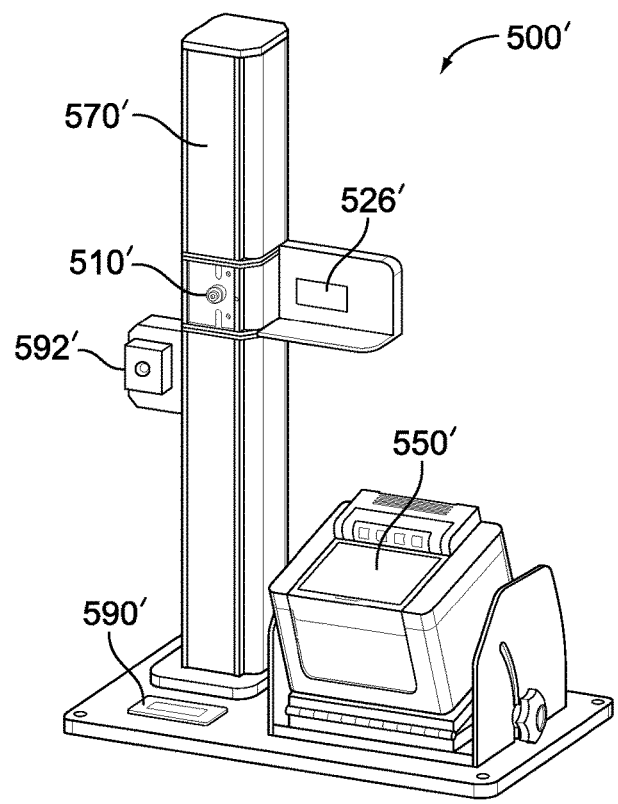
FIG. 5D illustrates a perspective view of a desktop/countertop biometric enrollment station for face, fingerprint, signature, iris, and barcode capture.

FIGS. 5C and 5D illustrate variations of the TES shown in FIGS. 5A and 5B. As shown in FIG. 5C, a TES 500' includes a variable intensity light 570', a face camera 510', and a fingerprint sensor 550'. As shown in FIG. 5D, a TES 500' includes all the elements shown in FIG. 5C and, additionally, an iris reader 526', a signature capture device 590', and a barcode reader 592'. All of the electronics to support the power distribution, the USB hub functionality and the inter module cabling is via internal printed circuit boards. The methods for face, fingerprint, iris and signature are similar to those used for the kiosk 100 to ensure high quality, standards compliant biometric capture in a simple, modular, fully enclosed configuration.

Face Enrollment Station

Figure 6A:
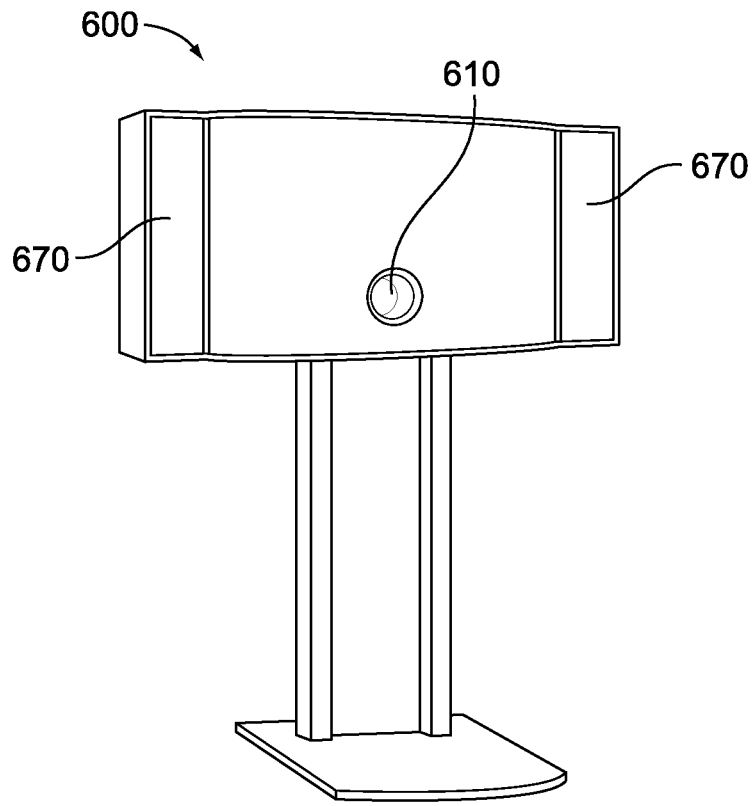
FIG. 6A illustrates a perspective view of a face enrollment station.

The unit 600 illustrated, for example, in FIG. 6A, has a camera 610 and lights 670 on a lift 620 and is very effective for driver's license face image capture. The camera 610 is adjusted automatically or manually to align with the level of the eyes of the applicant. The lights 670 turn on and adjust to optimal intensity for the skin tone and ambient lighting conditions. Multiple face images are captured and quality of the captured images is checked, and one or more compliant images are presented to the operator for selection and further use.

Figure 6B:
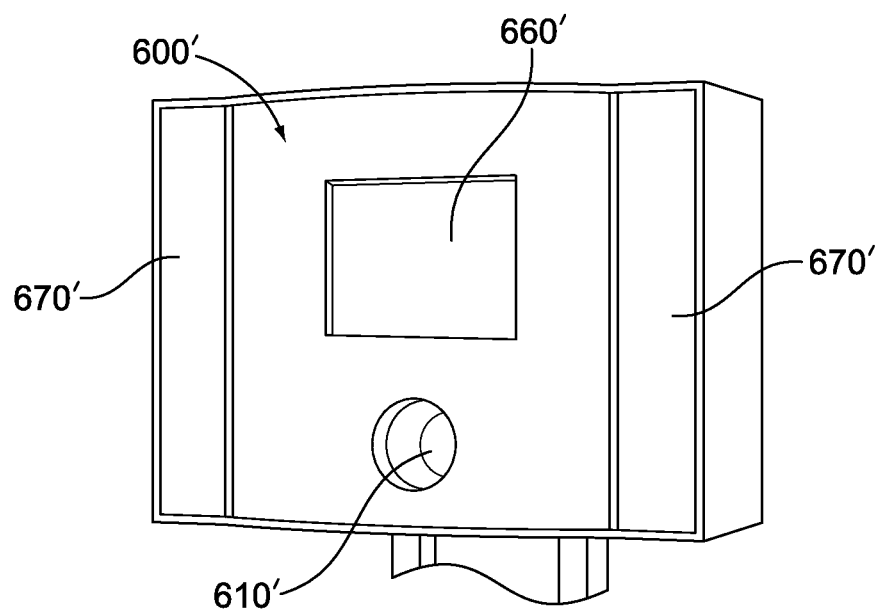
FIG. 6B illustrates a perspective view of a face enrollment station having a monitor.

In some applications, a unit 600' is provided where a monitor 660' is incorporated into the camera 610' and light unit 670' as shown in FIG. 6B. This LCD display 660' provides instructions to the enrollee and provides video feedback to the applicant that keeps his or her gaze directly in line with the camera 610'. The display 660' may be an LCD display or any other suitable display.

Each unit 600 and 600' has an axial adjustment range of about 26 inches (0.66 m) to accommodate the range of heights normally encountered and there is an option for up to about 52" (1.32 m) of axial adjustment range. Connections are power plus either a Universal Serial Bus (USB) 2.0 or network internet protocol (IP) at base of unit.

Biometric Verification Stations

Identity verification stations can take many forms and tend to be packaged for the specific type of application. Although the form factors are different, these units are built on the same Common Components that are described below.

Identity verification can be done with or without supplementary light. Supplementary light can be visible light or infrared (IR) light. The present inventors design, manufacture and deliver solutions for each option.

Identity Verification—No Supplementary Light

Figure 7:
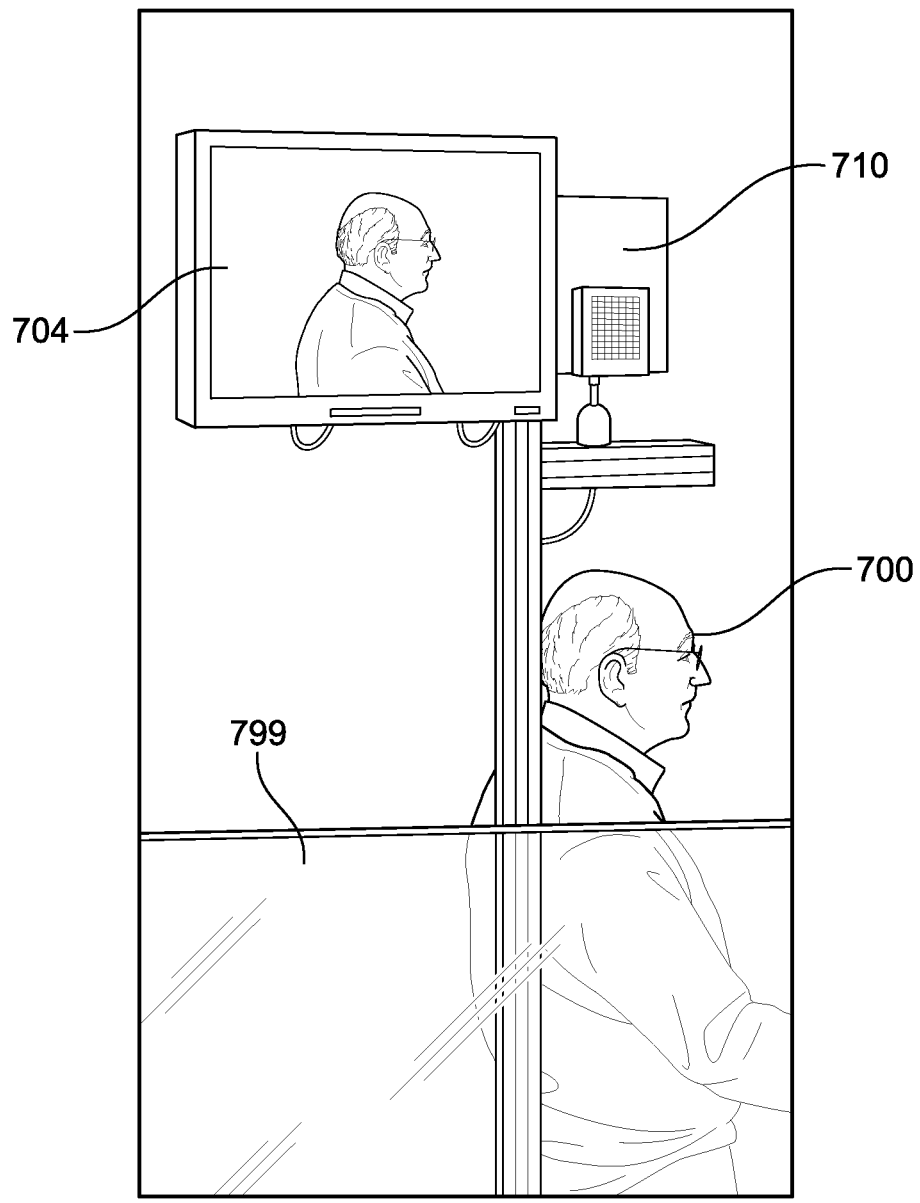
FIG. 7 illustrates a perspective view of a camera included in the biometric verification station for identity verification without supplementary light.

With ambient light, a camera must be capable of adjustments to accommodate changes in ambient lighting with varying time of day and weather conditions. FIG. 7 shows deployment of a biometric camera 710 at an immigration counter. In this case, a camera 710 is mounted behind the immigration officers at each of the entrances and exit ports for the country. A monitor 704 mounted to the left of the camera 710 displays the traveler's face and an LED based visualizer that provides visual cues and attracts the attention of the person 700 to look in the direction of the camera 710.

Identity Verification—Supplementary IR or Visible Light

The immigration counter may be surrounded by glass walls 799. A supplementary IR or visible light and camera 710 are attached to the top of the glass 799 and swivels to point to the path of the approaching traveler 700. An LED display 704 located below the camera 710 provides visual directions to the traveler 700 to proceed and/or to stop. The IR or visible light above the camera 710 provides supplementary lighting that is incident to the face.

This approach takes advantage of the ambient light and uses IR to minimize the shadows on the face of the traveler 700 thus yielding an image that is realistic to do visual recognition and is excellent for face recognition.

Identity Verification—IR Only

Figure 8:
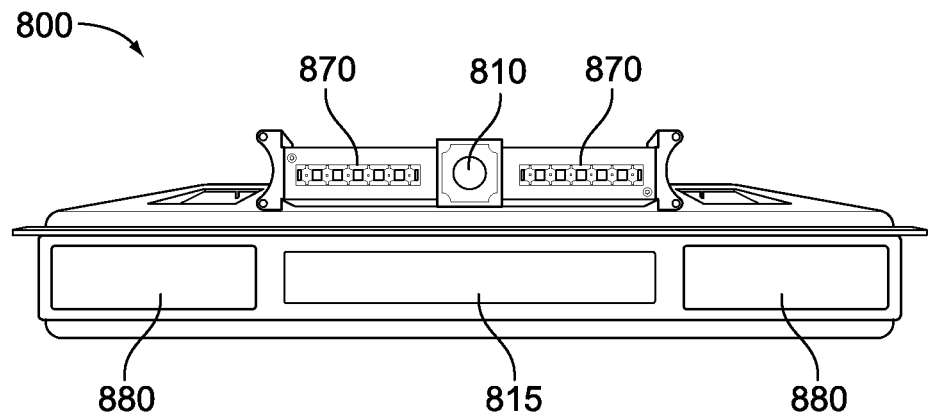
FIG. 8 illustrates a perspective view of supplementary infrared light included in the biometric verification station for identity verification.

For some applications IR lighting and IR images are the best solution. In the example shown in FIG. 8, inconspicuous image capture is achieved where space is very limited. A Camera 810 and lights 870 are shown on top of a kiosk 800. As shown, for example, in FIG. 8, the unit is installed in the kiosk 800 with a black or red IR filter 815 incorporated into a 2 inches (0.051) high×18 inches (0.46 m) wide plate with speakers 880 on the right and left hand sides of the camera 810 and light unit 870. As assembled, the camera 810 and lights 870 may be provided behind the black IR filter 815.

Identity Verification—Access Control

Figure 9:
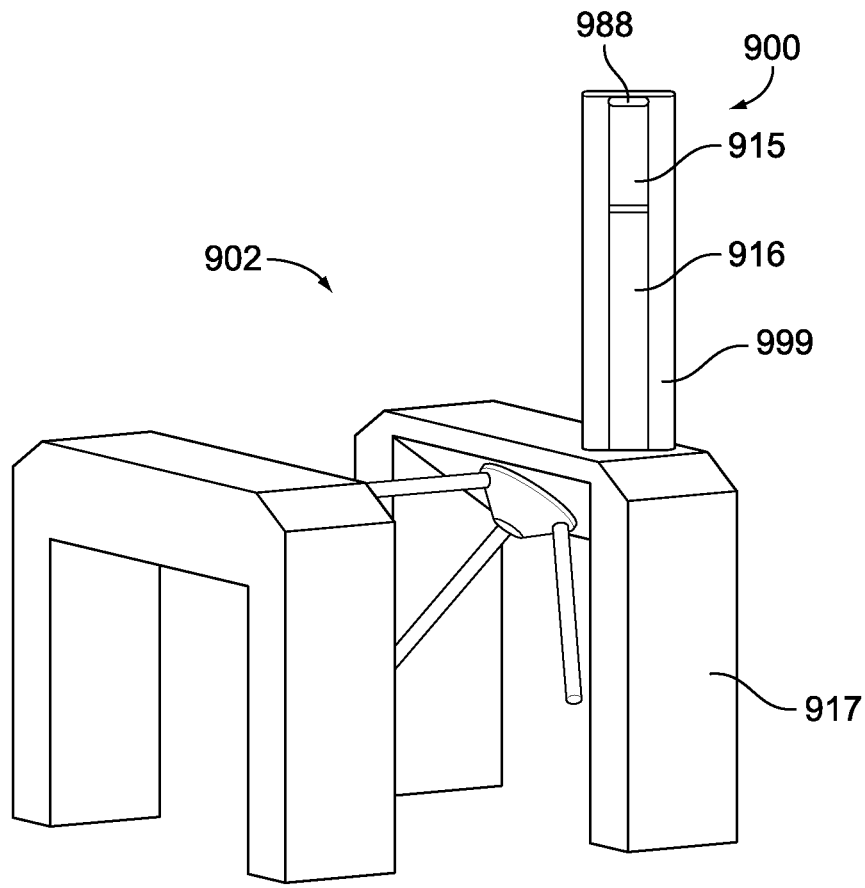
FIG. 9 illustrates a perspective view of a turnstile or eGate and an access control device included in the biometric verification station for identity verification.

Often face recognition is used in conjunction with other identification devices. For IR access control, one or more of the components shown in FIG. 8 and described above including, for example, the IR, Lights and Camera (e.g. 810, 815, 870) described above are incorporated into the top of the unit 900 shown in FIG. 9 as IR 910, lights 915, and camera 970, and a proximity card reader 916 is located below in the same housing 999. There is a built in red/green indicator 988 at the top of the unit that signals to the person that is passing that he or she can pass through the access point 902. The unit 900 can be wall mounted or an extended unit can be mounted on a turnstile or eGate 917 as illustrated, for example, in FIG. 9.

In both cases, the person passes his or her identification (ID) card past the proximity reader 916 and looks at the bar 988 at top. By looking at the bar 988, the person is looking directly into a camera and the IR lighting 970 is providing full light incident on the face. The bar 988 turns from red to green as soon as the person's identity is verified (typically 1 to 2 seconds) and the person can proceed to enter the facility.

Multi-Biometric Access Control (Fixed Numbers)

Figure 10:
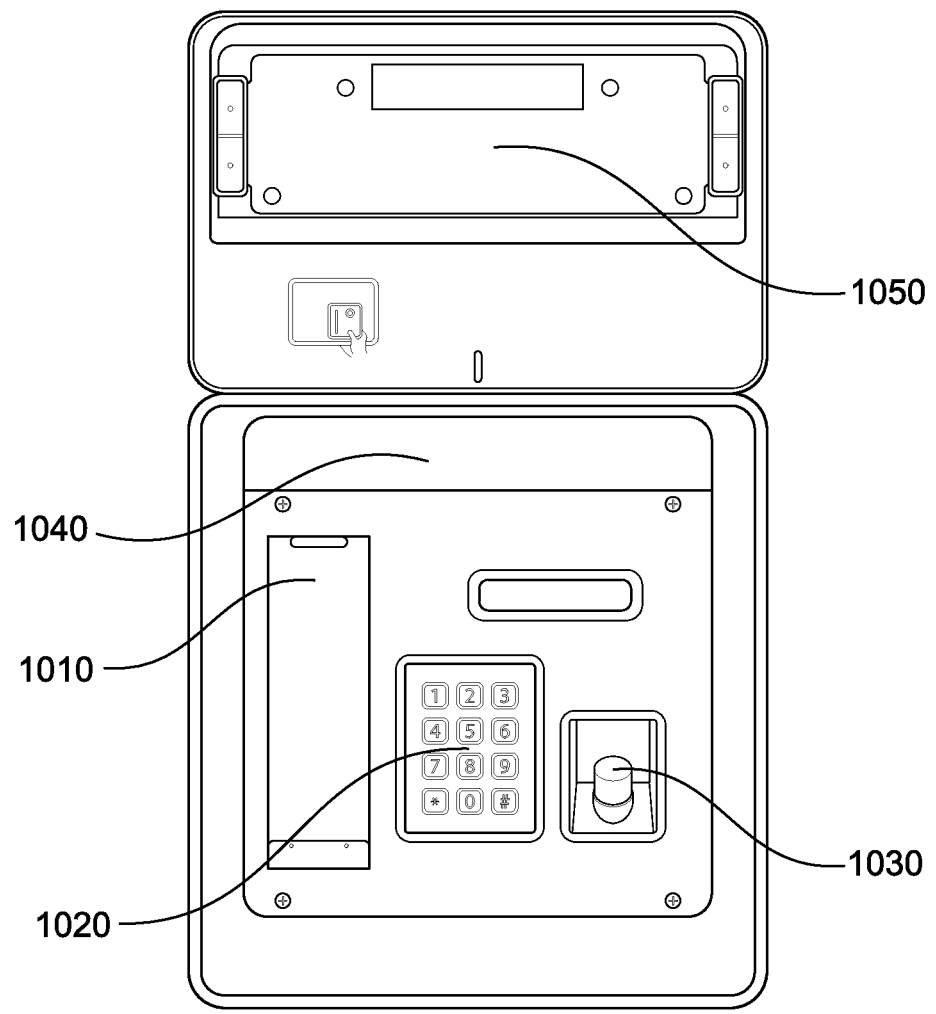
FIG. 10 illustrates a perspective view of a card reader, a personal identification number (PIN) entry device, a fingerprint reader, a face reader and an iris reader.

Access control often includes one or more biometrics. The present invention includes access control products (FIG. 10) that include one or more of a card reader (for example, 1010), a PIN entry device (for example, 1020), a fingerprint reader (for example, 1030), a face reader (for example, 1040) and an iris reader (for example, 1050).

Common Components

Each of the above configurations is designed to meet requirements for biometric capture, image processing and quality checking for enrollment and verification through biometrics.

Each is designed to meet accessibility requirements. The enrollment kiosks described above and shown, for example, in FIGS. 1, 2A, and 3 are for a standing subject and hence, move the capture portion of the kiosk up and down to accommodate the height of the applicant and people in wheelchairs. The Transportable Enrollment Unit shown, for example, in FIGS. 2B, 5A, 5B, is designed primarily for subjects that are sitting. The high resolution camera (e.g, 510 of FIG. 5A) has a field of view that allows it to capture the face image for people in wheelchairs or a wide range of heights. The TES units 500' in FIGS. 5C and 5D can be equipped with one camera for seated enrollment or two cameras for the wider field of view required for standing biometric enrollment.

Similarly the verification and surveillance units (FIGS. 6-9) are designed with either lifts or a field of view that accommodates the range of heights of the subjects.

Each configuration utilizes the same core technology and is built around the same face image, capture devices and software. Most units are designed with the ability to readily customize a portion to incorporate a variety of capture devices, card or document readers and receipt printers. The functions are similar and the principle difference is the size, packaging and the lift mechanism. Representative configurations might include: camera; lighting; fingerprint capture (one for verification, two or 10 for enrollment); signature capture; computer; monitor, usually touchscreen; speakers; bar code reader; card and document readers; and receipt printers.

All configurations may include software for: camera; lighting; image processing to ICAO, International Organization for Standardization (ISO) and InterNational Committee for Information Technology Standards (INCITS) requirements and image quality assurance; fingerprint capture and quality check; signature capture; face finding; and lift control.

Biometric Camera

The present inventors deploy high resolution industrial video cameras for face recognition applications and do not use consumer grade single shot cameras for a number of reasons including: consumer cameras have production life of 6 months or less so are obsolete often before they are deployed and software has to be changed to accommodate next generation model; consumer cameras are not designed for the duty cycle that one has in a commercial environment; consumer cameras are single shot cameras so you have to initiate capture again if the pose or gesture is not acceptable; and consumer cameras operate with a flash that creates strong shadows on the backdrop (e.g. 2350) making the image non-compliant to ICAO and ISO/International Electrotechnical Commission (IEC) requirements and making automated background removal more difficult. The flash often creates reflection and hot spots and gives differing brightness depending on the skin tone.

The biometric camera (e.g., 210) used in the configurations described above is designed to capture: high resolution color images (1.2, 3.1, 5, 6.6 or higher MP); a lens that captures faces for a range of people from short to tall; with electronics and housing suitable for continual high duty cycle use; and high speed data communications from the camera to the associated computer. The biometric camera is provided with a lens to meet the specific application requirements and this is usually an 8, 12 or 25 mm C mount lens.

Biometric Camera Software

The biometric camera is provided with a camera software development kit that provides the following features: camera control to adjust exposure, gain and gamma based on the lighting on the face of the person that the camera sees, which provides automatic compensation for changes to ambient lighting; face capture application programming interface (API) that captures many images and presents the best N images in real time; and face recognition suitable images for matching or other processing.

Software

Software is provided as a run-time license for each kiosk (e.g., 100, 200, 200' 300, 400). A software development kit (SDK) is provided, which enables the development of applications that need any of the following: face finding, face tracking, feature detection, face image quality analysis, normalization to ICAO image standards, and assess suitability for face recognition and/or printed photo.

The software evaluates, for example, fifteen image quality attributes in compliance with ICAO standard; normalizes face images to ICAO Type 2 (Full Frontal) and ICAO Type 3 (Token) image format standards or to other customer defined standards; provides powerful image manipulation functions to correct submitted images or live capture images to make them compliant; replaces or removes background as required for laser engraving and some printing applications; finds faces and identifies Moving Picture Experts Group 4 (MPEG-4) landmarks (e.g. eyes, nose, chin) for each face. Includes image display component which allows viewing of input and processed images (it also can display the facial landmarks); and supports ActiveX control API.

Figure 11:
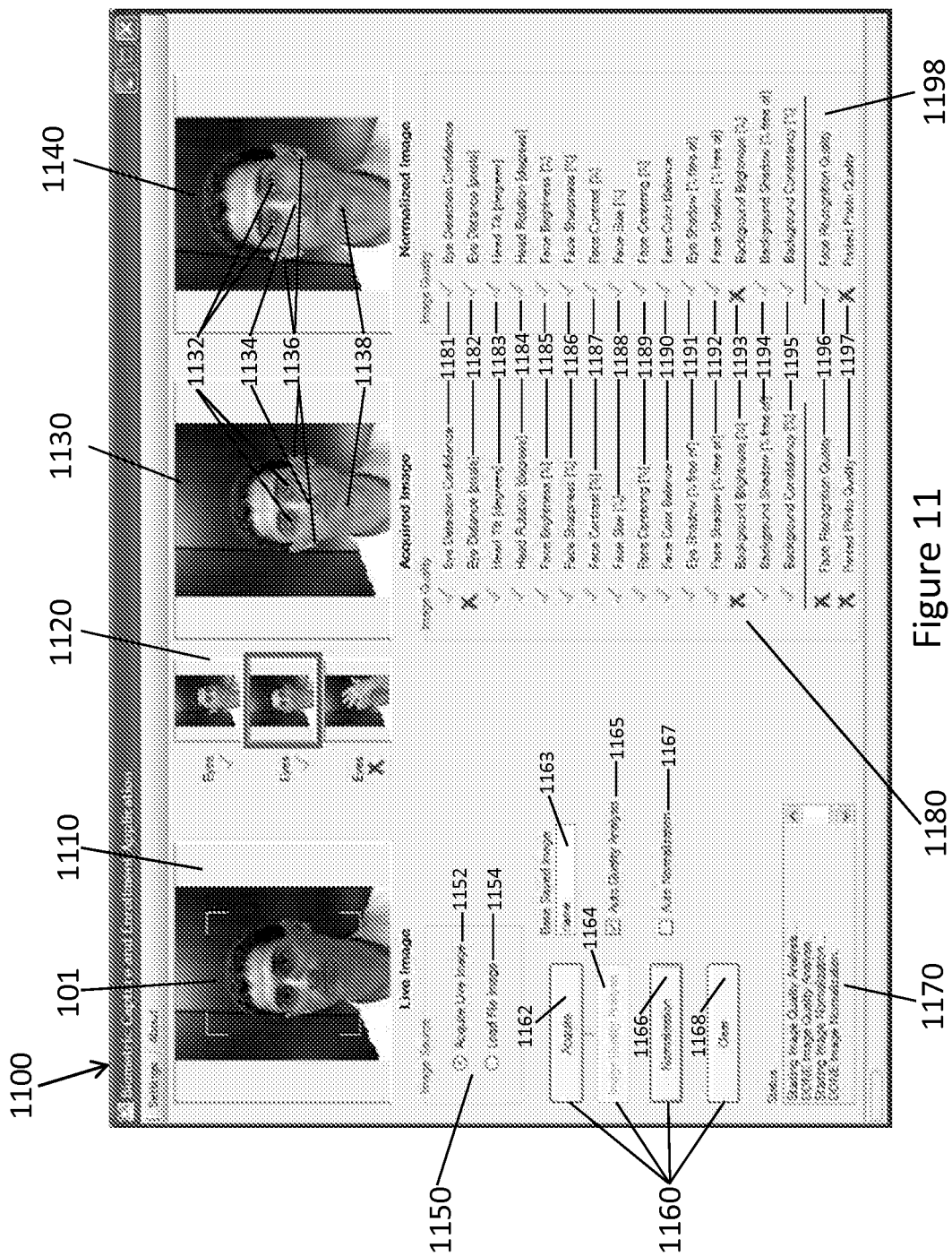
FIG. 11 is a screen shot of face image processing software.

An example of a screen shot from vision processing software is shown in FIG. 11. The software presents a screen image 1100 which includes a Live Image area 1110 for displaying the live image of the subject; a comparison area 1120 which compares three images of the subject to verify that the eyes of the subject have been captured (in this example, the first and second image are acceptable as denoted with a check mark and the third image is not acceptable as denoted with an X). The screen image 1100 includes an Acquired Image area 1130, where landmarks are established for the face (in this example, landmarks are displayed for the eyes 1132, nose 1134, ears 1136 and chin 1138) and a Normalized Image area 1140, where landmarks are established for the face (in this example, landmarks are displayed for the eyes 1132, nose 1134, ears 1136 and chin 1138). The screen image includes an Image Source area 1150, which may display radio buttons for Acquire Live Image 1152 (selected in this example) or Load File Image 1154 (not selected in this example); a series of input and status fields 1160, which may include, for example, an Acquire indicator 1162, an Image Quality Analysis indicator 1164 (not active in this example), a Normalization indicator 1166, a Clear indicator 1168, a Base Saved Image field 1163 (including the sample text "name" in this example), an Auto Quality Analysis radio box 1165 (selected in this example) and an Auto Normalization radio box 1167 (not selected in this example). The screen image 1100 includes a Status field 1170, which may include status updates such as "Starting Image Quality Analysis," "DONE Image Quality Analysis," "Starting Image Normalization," "DONE Image Normalization" and the like; an Image Quality area 1180 for the Acquired Image 1130, which may include, for example, indicators (either a check mark or X) to indicate whether each of a plurality of image quality attributes 1181-1195 is acceptable.

The attributes may include eye detection confidence 1181, eye distance (pixels) 1182, head tilt (degrees) 1183, head rotation (degrees) 1184, face brightness (%) 1185, face sharpness (%) 1186, face contrast (%) 1187, face size (%) 1188, face centering (%) 1189, face color balance 1190, eye shadow (% free of) 1191, face shadow (% free of) 1192, background brightness (%) 1193, background shadow (% free of) 1194 and background consistency (%) 1195. The screen image 1100 also includes a determination of whether Face Recognition Quality 1196 and Printed Photo Quality 1197 is acceptable, where Face Recognition Quality 1196 and Printed Photo Quality 1197 are calculated based on the attributes 1181-1195; and an Image Quality area 1198 for the Normalized Image 1140 that is similar to the Image Quality area 1180.

In this example, the Acquired Image 1130 passes for eye detection confidence 1181, head tilt (degrees) 1183, head rotation (degrees) 1184, face brightness (%) 1185, face sharpness (%) 1186, face contrast (%) 1187, face size (%) 1188, face centering (%) 1189, face color balance 1190, eye shadow (% free of) 1191, face shadow (% free of) 1192, background shadow (% free of) 1194 and background consistency (%) 1195; the Acquired Image 1130 fails for eye distance (pixels) 1182 and background brightness (%) 1193. As a result, it was determined that for the Acquired Image 1130, Face Recognition Quality 1196 and Printed Photo Quality 1197 were not acceptable.

In this example, for the Normalized Image 1140, all of the indicators passed except background brightness (%) 1193. As a result, it was determined that for the Normalized Image 1140, Face Recognition Quality 1196 was acceptable but Printed Photo Quality 1197 was not acceptable.

Light Assembly

The biometric kiosks described above, e.g., 100, 200, 300, 400 all included a light assembly that is built into the kiosks. The light assembly can also be provided in separate enclosures. The light assembly provides: light incident to the face to remove shadows caused by overhead lights; and with intensity that automatically adjusts based on the shadows on the face that are seen by the biometric camera (e.g., 210 of FIG. 2).

The light assembly is designed to: operate in a kiosk (e.g., 100, 200300, 400), in a separate enclosure for an individual light, or in an assembly with a biometric camera. The light assembly can operate as a single light with automatic light intensity adjustment or as a pair of lights (e.g, 125 of FIG. 1, 270 of FIG. 2A, 270' of FIG. 2B) which enables automatic side to side intensity balancing based on face shadows; have long life, white light emitting diodes (LEDs) provide a consistent color spectrum over the full range of control from 0 to 100% light output and over the life of lights, which is essential to get consistently good photos for printing (an alternate version that produces IR light can be used where a printed image is not required). The light assembly is sized to accommodate subjects that are as close as 30 cm to as far as 2 meters; the lights are designed for continuous operation, though they are usually deployed in a manner that just has the high intensity on when images are being captured; connections are provided for power and for connection to a computer via USB 2.0 port. A diffuser is specifically designed to focus the light and diffuse the impact of point sources; and this provides the visual impact of a soft bar of light and yet minimizes the light loss through the diffuser.

Ordinary diffusers such as white (milk) glass, frosted glass etc. have a near Lambertian (cosine law) output light distribution. Holographic diffusers can be made that have different output characteristics. A 70 degrees by 70 degrees diffuser may be used, meaning that the light intensity at 70 degrees from normal is half that measured straight on. Holographic diffusers can also be made asymmetrically as for example 20×70 degrees.

Lighting SDK

The lighting SDK is provided with each light and provides the following capability: manual lighting intensity adjustment for a specific light; automatic lighting intensity adjustment for all lights based upon analysis of the largest face in the video frame or still photo image; the video-based auto-adjustment may balance the lighting on either side of a face through a series of automatic steps that analyze and adjust the lighting intensities; for video-based auto-adjustment, it is designed to work specially with video produced by the biometric camera SDK; and support for the following lighting configurations: 1 single light, or 2 lights on either side of the camera.

This SDK provides the automatic light intensity control that is particularly important for enrollment applications and for applications where the light intensity varies with external factors such as time of day, weather or seasons.

Backdrop

The backdrop unit comes in either a free standing or wall mounted version. The free standing version ships as two bases, two side supports (anodized aluminum or stainless), a top and bottom crossbar, and the backdrop. The backdrop is typically 18% grey in color but can be of any color or shade as is required, vinyl coated polyester fabric that is tearing, water and mildew resistant and can withstand long exposure to sun. The backdrop hangs wrinkle free and can be easily wiped clean. Backdrop side posts are about 84 inches (2.13 m) long and the backdrop about is 48 inches (1.22 m) wide by about 52 inches (1.32 m) high. The wall mounted backdrop is the same size and comes with brackets that attach to the wall and the same top and bottom crossbars and backdrop material.

Face Recognition

The present invention includes security software and identity manager software, which provide large scale face recognition solutions. The security software provides the application for face recognition based surveillance. The performance characteristics of this system are tuned to handling a large number of cameras each delivering many different face images per second captured in a non-cooperative environment and matching each image against a large watchlist image database.

The identity manager software provides the application for face recognition based (1-1) identity verification, (1-n) watchlist checking and (1-all) fraud checking. This is designed specifically for organizations that are issuing passports, visas, national ID, driver's licenses and other secure ID.

The core technology behind each application is the same, as follows: visual matching verification software performs the 1-1 matching required to verify an applicant's identity and can be deployed at the point of application or as a central service. Visual matching watchlist software performs the 1-n matching required for identifying if the person is on the watchlist and includes the adjudication of probable matches and maintains the transaction audit trail. Visual matching enterprise software performs the 1-all matching required for identifying if the person is already in the database under a different name, which is very similar to visual matching verification software watchlist software but scales to deal with tens of millions of images and provides for the binning, adjudication and investigation, ad hoc searching, reporting and audit trail functions. Visual matching software is designed to use the leading face recognition engines and provides the opportunity for the plug replacement of algorithms with no impact on the application code.

The system is designed as an n-tier architecture with separation of communications, user interface and application and database. Business rules can be included in the application, but it is preferred to incorporate them in a separate rules engine. The multi-biometric access control platform provides the environment and application to incorporate face, fingerprint and iris into an access control system that incorporates standard interfaces to legacy facility access control systems.

Fingerprint Matching

The fingerprint matching solution is part of the multi-biometric platform and utilizes the same match engine for both verification and identification. The solution is a standards based solution that is vendor neutral, secure, open and scalable.

The solution complies with the following standards: Finger Image-Based Data Interchange Format standards including INCITS 381-2004, American National Standard for Information Technology and ISO/IEC 19794-4, International Organization for Standardization; Fingerprint Image Quality standards including National Institute of Standards and Technology (NIST) Fingerprint Image Quality (NFIQ)-NIST Interagency Report 7151 (NISTIR 7151)-NIST Interagency Report, August 2004; Finger Minutiae Format for Data Interchange standards including INCITS 378-2004, American National Standard for Information Technology and ISO/IEC 19794-2, International Organization for Standardization; Data Format for the Interchange of Fingerprint, Facial, & Scar Mark & Tattoo (SMT) Information standards including American National Standards Institute (ANSI)/NIST-Information Technology Laboratory (ITL) 1-2000—NIST Special Publication 500-245, 2000; Electronic Fingerprint Transmission Specification standards including Integrated Automated Fingerprint Identification System (IAFIS)-DOC-01078-7.1 Criminal Justice Information Services (CJIS)-RS-0010 (V7.1) Criminal Justice Information Services, Federal Bureau of Investigation, Department of Justice, May 2, 2005; Application Programming Interface and Service Provider Interface for a standard biometric technology interface standards including ANSI INCITS 358-2002 (BioAPI v1.1); Common Biometric Exchange Formats Framework (CBEFF) standards including INCITS 398-2005, American National Standard for Information Technology and ISO/IEC 19785-1, International Organization for Standardization; and Biometric Specification for Personal Identity Verification standards including NIST Special Publication 800-76.

The solution is scalable in both the number of users and the number of enrollees. The software is designed to scale. The hardware architecture allows for easy addition of servers to the matching server cluster to accommodate growing numbers of enrollees and demand on the matching engine. The architecture provides for separate servers to support the users and through clustering these too can be readily expanded to accommodate the demand. The largest matching engine deployment is in the order of 80 million enrollees with 4 fingerprints enrolled for each. Grid computing architecture supports the scaling of the solution.

The solution is interoperable with other major biometric techniques and acquisition devices. The fingerprint system can accept almost any fingerprint capture type including those captured using scanned ink-on-paper and multi-finger livescan devices, including: multi-finger devices and scanners (including Federal Bureau of Investigation (FBI) Appendix F & G devices); and plain impression and rolled impression single finger optical, capacitive, radio frequency (RF) and ultrasonic devices (including FBI Appendix G devices).

The software supports over 100 fingerprint-based devices (stand-alone devices, keyboards, mice and laptop computers) with fingerprint sensors from over 30 fingerprint sensor manufacturers, including: plain impression single finger optical, capacitive, radio frequency (RF) and ultrasonic devices (including FBI Appendix G devices); and sweep sensor technology. Moreover, image normalization techniques enable persons to enroll on device A and be matched (or searched) using device B.

The computer hardware is general purpose and configured so that it can take advantage of advances in processor speed and architecture. The present invention utilizes, for example, 64 bit processors and the software takes advantage of multi-threading so the use of faster machines with more cores and more memory is straight forward. The grid computing architecture for the fingerprint solution makes the use of diverse machines of differing performance characteristics practical.

Face Capture and Biometric Enrollment

The present devices, systems and methods are all associated with making face recognition work better. They fall into two groups: (1) devices, systems and methods to capture face images in challenging environments, including histogram adjustment, monochromatic light, illumination module and face tracking; and (2) devices, systems and methods for biometric enrollment to provide optimal biometric images for matching including backdrop shadow removal; and devices, systems and methods relating to multi-biometric kiosk and associated chain of trust.

Face Capture—Histogram Adjustment

Present day face recognition algorithms are typically based on 8-bit digitized images, i.e. having a maximum of 256 grey levels in monochrome images. Color images/information is almost never used. This has been quite sufficient since the vast majority of cameras employed do not produce images with that many Effective Number of Bits (ENOB). Ordinary surveillance type video cameras are hard pushed to produce 6.7 ENOB (approx 100 grey levels). However some high end cameras have appeared on the market that feature charge-coupled device (CCD) technology sensors having a nominal 12 or 14 bit output. The present inventors have tested one of such cameras with a nominal 12 bit output and found it to have 10.6 ENOB (>1500 grey levels). In well exposed images taken with a 12-bit output camera normally the 8 most significant bits are used as the input to the facial recognition algorithm with excellent results. However in many, especially surveillance type applications, a correct exposure cannot always be achieved due to different ambient light conditions during the day and/or the subject's pose and orientation with respect to the light.

When setting up such a camera it is usually done in such a manner that does not cause the sensor (or parts thereof) to be saturated (bloom) under the brightest of anticipated light conditions. This is done since practically all useful pixel information is lost once it is saturated. Such an abrupt change in information loss does not occur on the lower end of the brightness conditions. As the ambient brightness decreases the information is gradually lost in the noise.

By analyzing the histogram of the image and applying some heuristic methods, the present inventors determined which bits in the image carry useful information and then map these to an 8-bit space image. Ideally, this would be done across those parts of an image that portray faces only but in very dark images, they may be difficult to find and an iterative process is employed. In such images, the histogram shifting/compression/expansion is first performed on the entire image and once the face regions are identified the process is repeated using the raw data for these regions only.

Histogram equalization and histogram compression/expansion are included in image processing techniques. The present inventors have advanced the state of the art by applying these methods to the face recognition field. Moreover, the present inventors have found that various refinements based on typical face histograms allow one to reject spurious information (such as a glint of light reflected from eye-glasses) and judicious removal of outlying data (such as at the very upper and lower end of the facial histogram). By implementing such refinements the effectiveness of the histogram redistribution is greatly enhanced.

Figures 12, 12A, 12B, 12C, 12D, 12E:
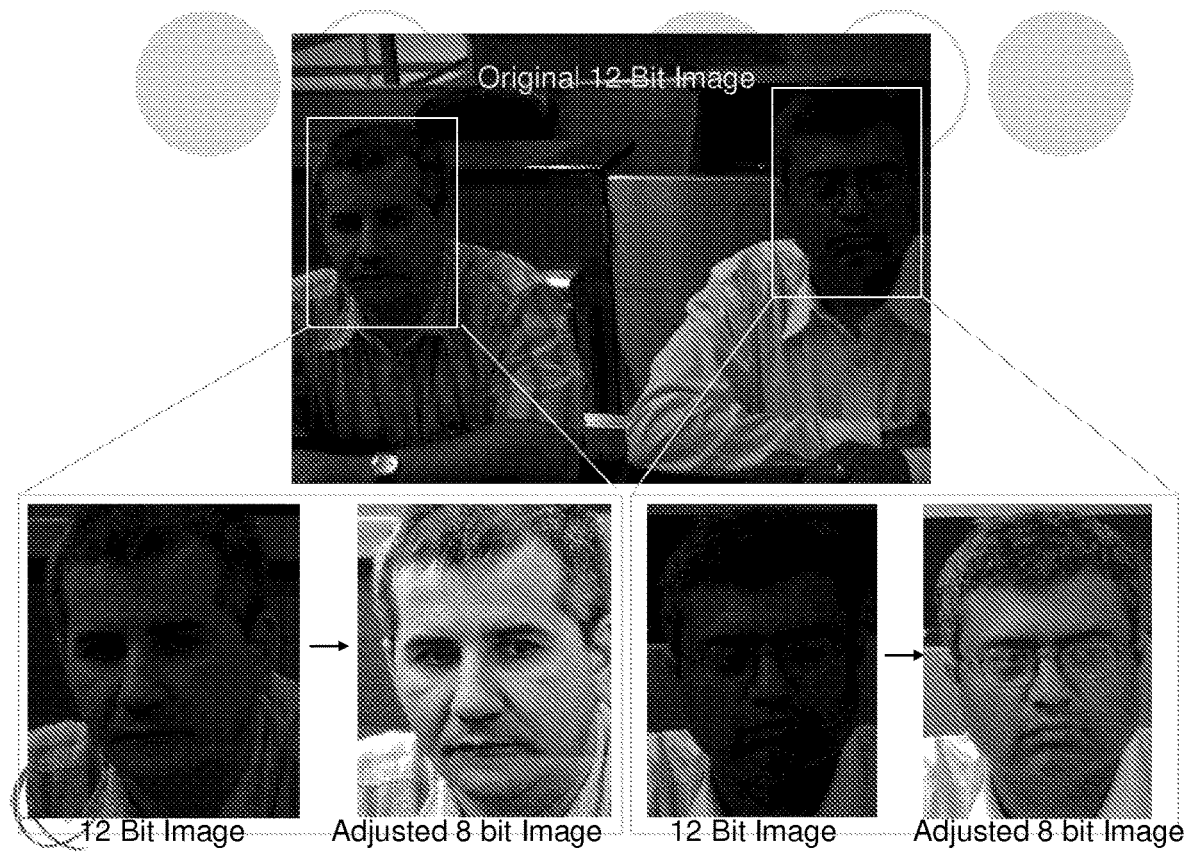
FIG. 12 are images showing an example of image capture correction output of a 12-bit camera to an 8-bit input of a facial recognition algorithm.
FIG. 12A is an original 12-bit image.
FIGS. 12B and 12D are cropped portions of the original 12-bit image.
FIGS. 12C and 12E are adjusted 8-bit images resulting from the images shown in FIGS. 12B and 12D, respectively.

In, for example, FIG. 12, it can be recognized that the two faces in the original image (FIGS. 12A and 12D) are barely detectable and they are certainly not suited as input to any facial recognition algorithm. By applying the techniques of the present invention described above, two acceptable images are arrived at that are suitable for facial recognition purposes (FIGS. 12C and 12E). Although in the above description an example of matching the output of a 12-bit camera to an 8-bit input of the facial recognition algorithm is discussed, it is clear that the process can be applied to transform any x-bit image to any y-bit image where x and y can be any number.

Mono Chromatic Light Source

The present invention may incorporate use of a monochromatic light source to minimize the effects of sunlight while taking facial images outdoors. The performance of facial recognition technology depends very much on the quality of the image. Best performance is achieved with well exposed, evenly-lit frontal illumination that does not cast shadows across the face. In a practical sense, such images can only be taken in a controlled indoor environment where suitable illumination can be a part of the camera set-up.

In outdoor situations, the angle and intensity of illumination is mostly determined by the position of the sun in the sky, presence of nearby objects, such as buildings and vegetation, and atmospheric conditions (clouds, haze, etc.). Additional controlled illumination to ensure an even illumination across the face is almost never an option since the amount of light to compensate for the effects of the sun would require such high intensity light sources as to make it utterly impractical. For these reasons facial image capture in unprotected outdoors environment is practically impossible on a consistent basis.

The present invention may use a monochromatic light source and may equip the camera with a narrow band pass filter which transmits almost all of the light reflected from the subject's face that originated from this monochromatic light source. This filter also passes a small portion of sunlight, that portion of the spectrum that lies within the pass band of the filter and reject all other sunlight. In this manner the influence of sunlight is greatly reduced allowing suitable illumination to be provided by only a relatively weak source of monochromatic light.

The present inventors have found distinct advantages in combining a monochromatic light source with a very narrow filter mounted over a camera lens to reject sunlight. The application of this method to capture faces in varying daylight conditions greatly enhances the application of facial recognition technology in difficult outdoor conditions.

Another benefit of such deployment is that it works well during the day as well as night since the filter removes almost all of the sunlight. Therefore, the monochromatic illumination source needs not to be adjusted and can remain switched on permanently. The present inventors implemented these principles using a 35 W low pressure sodium lamp, which emits light at two distinct wavelengths, i.e. 589.0 nm and 589.6 nm, close enough to be considered monochromatic. A narrow band filter with a nominal 10 nm wide (measured at half maximum transmission) pass-band centered about 590 nm was selected for experimental purposes. A filter with a narrower pass band may be used to provide even more sunlight attenuation.

Figure 13:
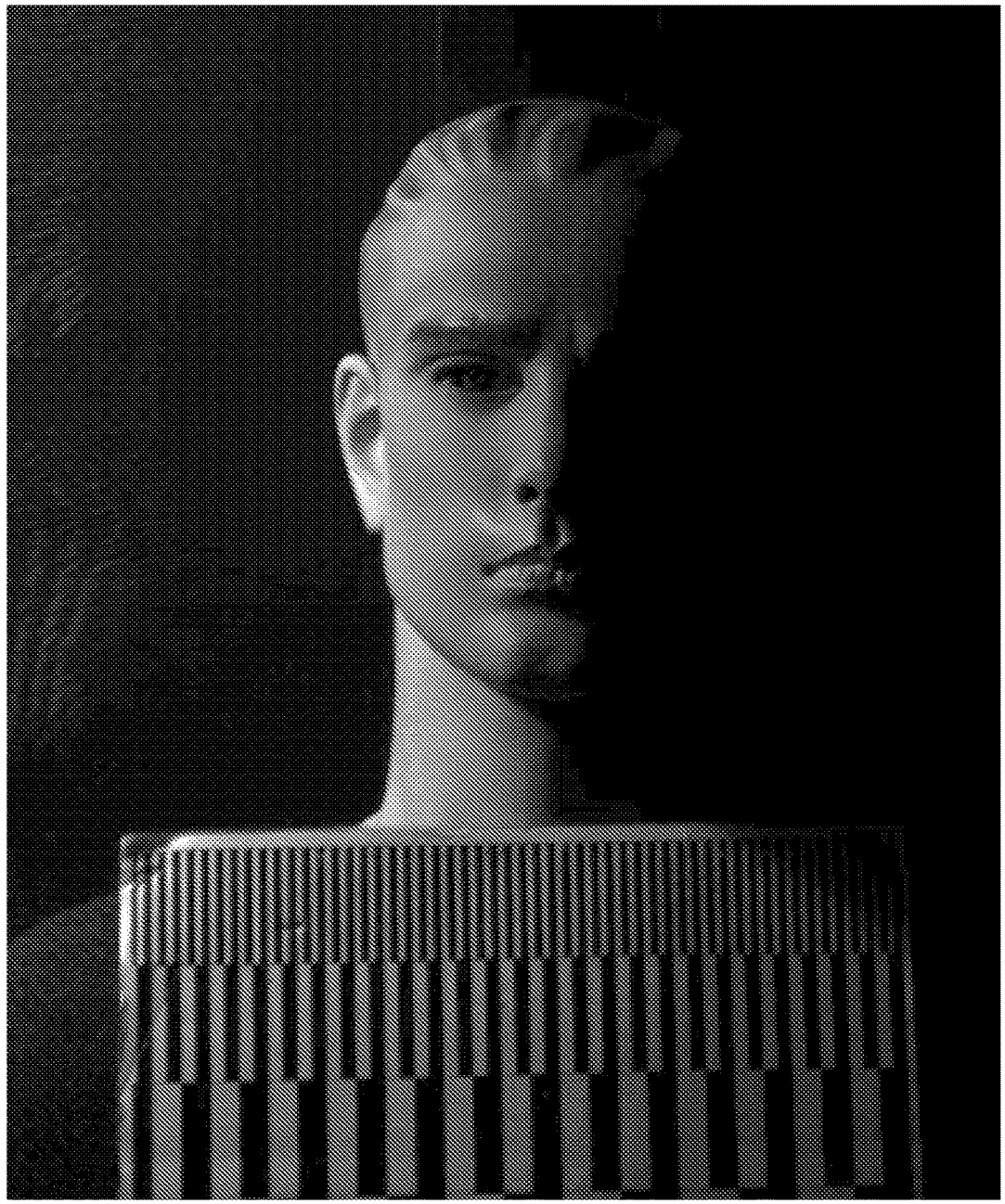
FIG. 13 is an image taken with two 500 W halogen lights placed about two feet away, to the left and above the subject's head.
Figure 14:
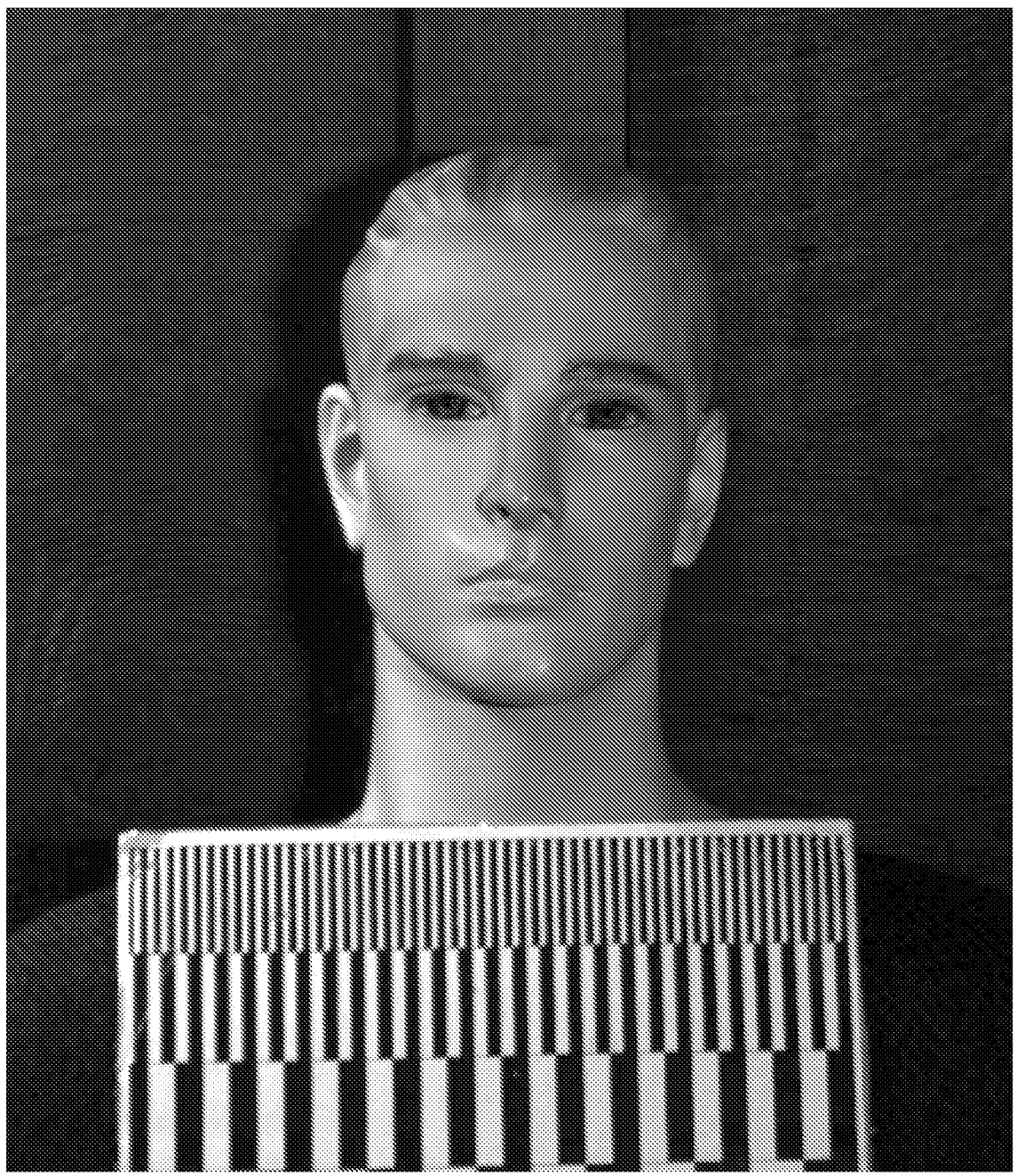
FIG. 14 is an image taken under the same conditions as in FIG. 13 with the exception of a 35 W low pressure sodium lamp positioned about six feet away from the subject and close to the camera.

As an illustration, the picture reproduced in FIG. 13 was taken with two 500 W halogen lights placed about 2 feet away, to the left and above the subject's head. While the left side of the image is relatively well exposed (although a severe shadow exists under the eyebrow) the right side of the image is entirely shaded and no details can be observed. For comparison, another picture (FIG. 14) was taken under the same conditions with the exception of a 35 W low pressure sodium lamp positioned about 6 feet away from the subject close to the camera. Moreover, the camera was this time equipped with the narrow band pass filter. The effect of the two 500 W halogen lights has been reduced to a minor influence. Both sides of the image are well illuminated and no shadows can be noticed.

Illumination Module

The illumination module was designed to provide even-illuminated facial images. In the simplest of terms, the facial image captured by the camera is analyzed and the average light intensity of the left side of the face is compared to the average light intensity of the right side of the face. If an imbalance is measured, then the light output intensities of the light modules located to the left and right of the camera are adjusted automatically to obtain the most balanced condition. The same can be done comparing the brightness of the upper part of the face and the lower part.

Conventional light sources cannot be dimmed easily if at all (e.g. cold cathode fluorescent lights and fluorescent lights). Conventional light sources cannot be dimmed without changing the color temperature of the emitted light such as in the case of incandescent (including halogen) lights. This means that as the color temperature changes, the light balance of the color camera is adjusted. In conventional light sources, the modulation frequencies are entirely incompatible with faster exposure (shutter) times. For example, with cold cathode fluorescent light and fluorescent light, main frequencies of 50 Hz/60 Hz are entirely incompatible with exposure (shutter) times of 1/50 second or faster.

In the present invention, lighting control is based on face finding, landmark finding and light intensity levels in each of 4 quadrants of the face. The present inventors have overcome the above-mentioned problems by using white LEDs modulated at a frequency of greater than 10 kHz.

Smart/Intelligent/Adaptive Illumination

The success of facial recognition depends to a large extent on the quality of the facial images to be compared. The quality of the facial image in turn depends on many factors such as the sensitivity, resolution, dynamic range, responsivity, etc. of the camera (by camera here is meant the entire system; lens, sensor and electronics). It furthermore depends on the intensity and directivity of the light shining on the face.

In most situations where facial images are captured, a suitable camera system can be specified that captures good quality images provided the illumination of the face meets certain requirements. Seldom does the environment in which a camera is installed provide adequate illumination of the face necessitating the use of extra illumination sources. There are three main basic problems with the ambient illumination conditions in a given locale: insufficient light, inadequate illumination direction and variable illuminating conditions. Many indoor locations are not sufficiently lit to provide adequate illumination. This can often only partially be overcome by using faster lenses at the expense of reduced depth of focus or by using cameras with larger sensors and/or more sensitive sensors which are costly. Many indoor locations have only overhead lighting which result in shadows being cast from above. Often this causes shadows to be cast across the eye sockets thereby making the correct determination of the center of the eyes more difficult, if not altogether impossible. The correct determination of the center of the eyes is one of the most important metrics in facial recognition.

Outdoor applications experience wildly fluctuating illumination conditions depending on the position of the sun in the sky and the amount of cloud cover, mist or rain. Indoor applications, too, suffer often from fluctuating illumination conditions, especially if there are nearby windows or glass doors, as often is the case.

Although additional, well placed, illumination sources can provide some relief in certain locations this is not always the case or practical. For example, in order to compensate a condition where the sun is more or less directly above or behind a subject's head, very powerful additional frontal illumination would have to be employed as to blind the subject or at least be very uncomfortable to him/her. Although this clearly would be an extreme case, a much less severe situation, that being an indoor application with windows or transparent doors nearby, still present a situation where simple additional light sources are not sufficient to guarantee an even, well lit illumination across the face over time.

Smart Illumination

Since the facial recognition process involves finding a face in an image, the present inventors apply image processing techniques to determine, for example, if the overall level of illumination of the face is sufficient, if both sides of the face are equally illuminated and whether there are shadows cast across the face and especially across the eye sockets. The results of this analysis are transformed into commands to illumination sources, the output of which are controllable, so as to obtain the desired illumination profile across the face of the subject.

In a typical situation, a first image is obtained using default illumination settings which may be fixed (constant) or be derived from historical data (such as time of day or an average of a recent number of optimized settings) or by other heuristic means. This first image is then analyzed and the optimized illumination profile computed before taking other images for facial recognition purposes.

Although, in principle, a number of illuminating technologies can be used applying the above described concept, most are not practical in this application. The use of incandescent lights (including halogen) is restricted because of their change in color temperature when dimmed and also their relative slow response times (tens of milliseconds). The use of fluorescent lights is also restricted due to slow start-up time, their limited dimming range and the relative high cost of electronics of the dimming circuitry. Most other illuminating technologies have a variety of other associated problems; however the recent advancements in white LEDs present a suitable solution. The efficiency (lumens per watt) of these LEDs equal that of incandescent and halogen lights. Also, the present invention is adapted to utilize LEDs having an efficiency that is comparable to fluorescent lights. Moreover their cost (dollars per lumen) has steadily declined and is now at a point where they compete effectively in certain applications.

In the application described above the use of white LEDs is particularly attractive since they have a full spectrum output with a range of color temperatures optimized for such applications. Furthermore they can be dimmed over the full range (0%-100%) without a noticeable change in color temperature. Also, this dimming can be done effectively (i.e., without wasting much energy) using pulse-width-modulation technique. Lastly, the response time (turn-on or turn-off) is in the sub-microsecond range allowing precise timing control of the illumination, reducing overall power requirements and inconvenience to the user.

In a typical application, the illumination sources would be on at a reduced level so as to save power and extend the life of these sources. A first image would be taken using default settings and further images taken at the computed intensity levels for the various illumination sources. These computed intensity levels can be applied for the duration of the image taking session or only during those times when the actual images are taken. This latter scenario would mean that the sources are "strobed" every time an image is taken.

The present inventors have developed devices, software, systems and methods of face-finding in an image and using that facial image to control the illumination sources to optimize the illumination across the face. When properly implemented, the present devices, software, systems, and methods increase the accuracy of facial recognition in many applications because the process results in images that are better suited for facial recognition purposes.

Advanced Tracking Algorithm (developed and tested for foot traffic type system)

In a surveillance application it is of utmost importance to be able to process as many facial images in the shortest amount of time. It would be a waste of processing power (and time) to find faces in each and every image and carry out face recognition. This waste is avoided by determining that the face recognition has already been performed in previous images. It is computationally much less intensive to track the face once a good image of a particular face has been acquired compared with face recognition, especially if the databases to be searched are large.

Face tracking has been developed to a high degree but cannot be used when the face is turned away from the camera. Other video tracking methods must then be employed for tracking purposes and once the face is turned again towards the camera a simple comparison (i.e. is this the same face as the face tracker was tracking before it switched over to the video tracking mode?) is made to ascertain if it is the same person rather than searching through a database to see who it might be. There are many methods of tracking; face and video object tracking have already been mentioned, but others have been developed based on position, orientation, trajectory, speed, etc. These are not as robust by themselves but still can provide a high degree of likelihood that a certain face is the same as assumed. Again a simple comparison is all that is required to confirm or deny that assumption.

Tracking within the field-of-view of the camera has been expanded to persons that cross in front of one another in the field of view of the camera by calculating trajectory paths and instantaneous positions. Tracking is not necessarily defined to objects within the field-of-view of the camera but can also be applied to persons that disappear from the field-of-view and re-appear based on position, trajectory and elapsed time. This idea has been expanded to multiple cameras whose fields-of-view do not necessarily overlap. Again based on position, trajectory and speed some assumptions may be made as to when a person who leaves the field-of-view of one camera enters the field-of-view of the next camera.

By employing various tracking methods and methodologies the performance of and speed of any given surveillance type system enhanced tremendously and the advantages gained can be traded off, if so desired, by employing fewer cameras, using less powerful or fewer computers etc.

The present inventors have developed an approach as described herein that perfects and improves many tracking methods by integrating numerous methods of tracking into a single very powerful tracking/prediction algorithm.

Biometric Enrollment—Backdrop Shadow Removal

In a conventional photographic set-up, illumination sources are required to illuminate the face and reduce any shadows on it. In a professional studio, light sources are placed some distance apart and directed at a typical angle of 45 degrees to the subject. When a back-drop is used, which is normally the case, a strobe light is often employed to wash out any shadows on the back-drop the light sources would otherwise create. In enrollment situations such conditions are almost never attainable due to lack of space and/or money. Therefore, a camera and one or more light sources in close proximity to this camera are used as well as a backdrop situated closely behind the subject (in order to save space). Such a set-up causes shadows from the face to be projected by these light sources on the backdrop which is considered objectionable by many users of such an enrollment system. In order to eliminate such shadows a set-up is presented here that eliminates such shadows.

The normal backdrop is replaced with a light-box which produces an evenly illuminated face front when switched on. Such a light box may employ fluorescent tubes, incandescent lamps, LEDs etc. although the evenness of illumination on the front surface of the box typically means the use of optics and diffusers when using these sources. More suitable candidates are electroluminescent panels and side-illuminated LED panels (as used in large flat screen televisions). Such panels can be very thin, one millimeter thick for electro-fluorescent sheets and less than 1 inch (2.54 cm) thick for side-illuminated LED panels.

In operation, two images are taken of the subject in rapid sequence. During the exposure of one of these images the light box is switched on (FIG. 15) and in the other it is off (FIG. 16). During that exposure when the light box is switched on, no light from it falls on the face of the subject that is visible to the camera since the light box is right behind the subject. Once these two images are acquired, they are compared. Those image pixels that show sufficient different value are identified as being part of the background. Once identified, these pixels can be replaced by any value or pattern desired (FIG. 17). This concept requires that the light box can be switched on and off very fast, which is the case for both electroluminescent panels and LED panels.

The requirement for the camera to take images in rapid succession is easily met by the current generation of cameras. Exposure times of 1/50-th of a second or 1/25-th of a second apart are sufficient to acquire high quality images without any discernable motion of the posing subject being noticeable.

Figure 15:
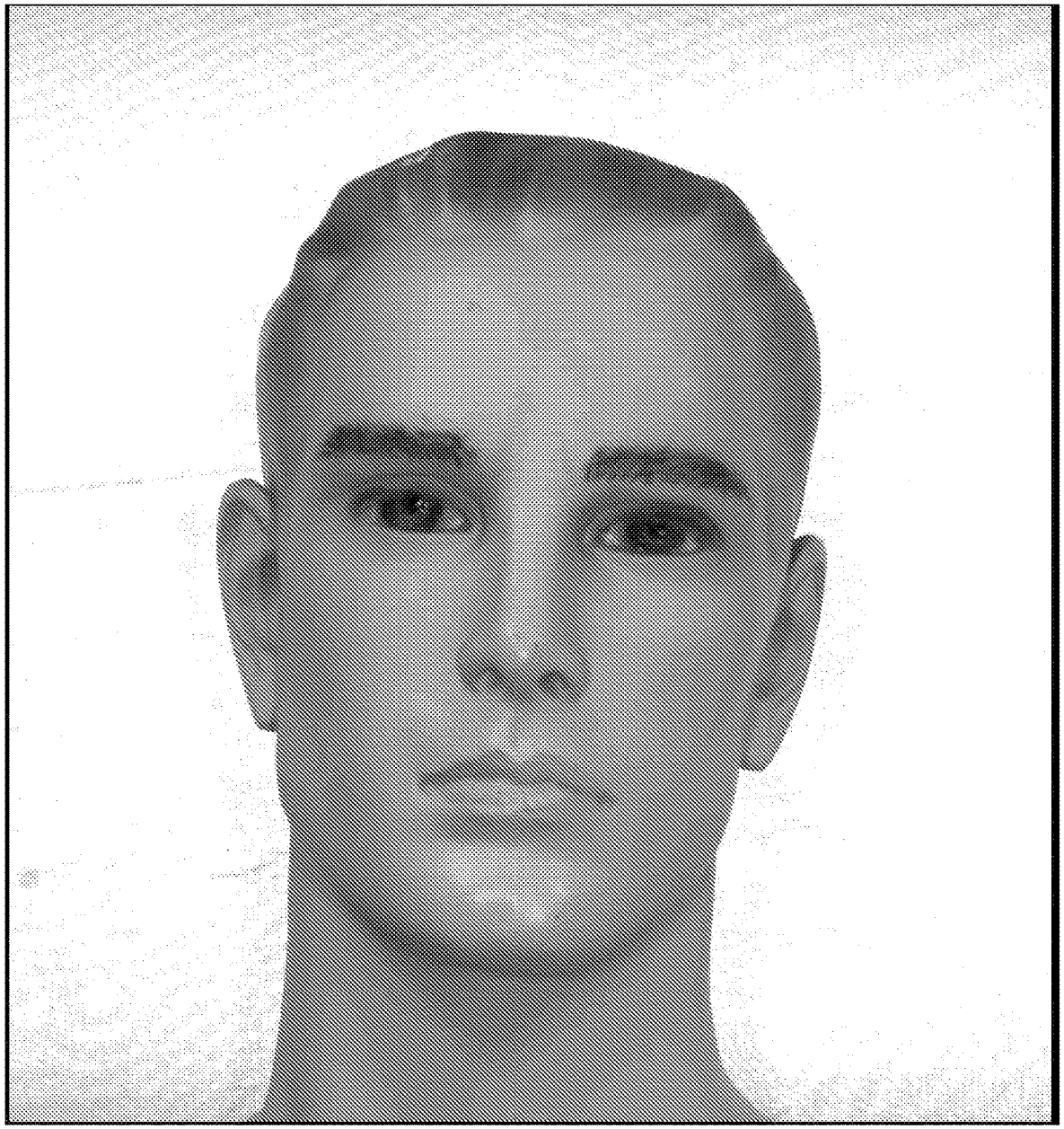
Figure 16:
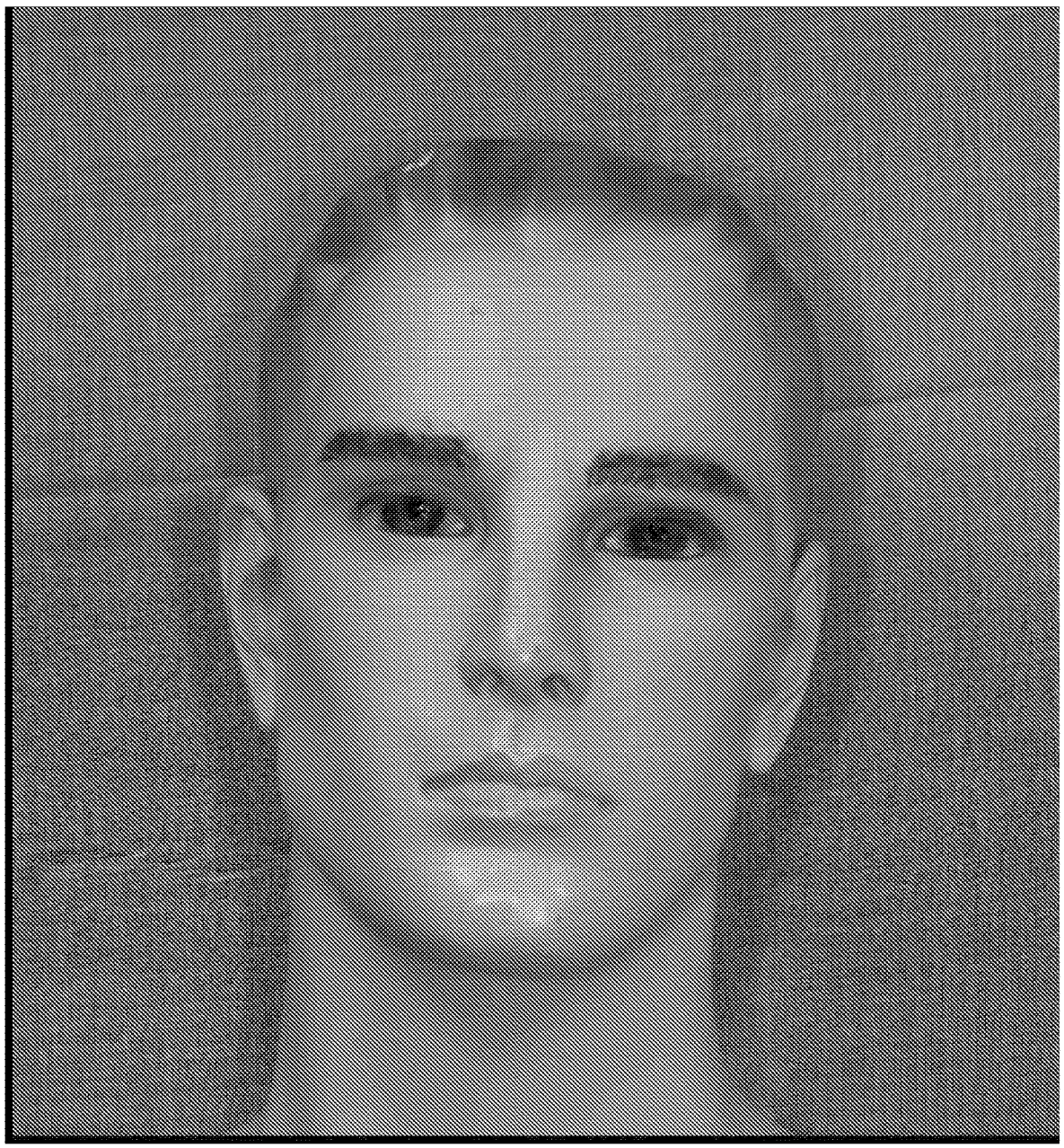
FIG. 16 is an image where the background of the image is the covered LCD monitor switched off.
Figure 17:
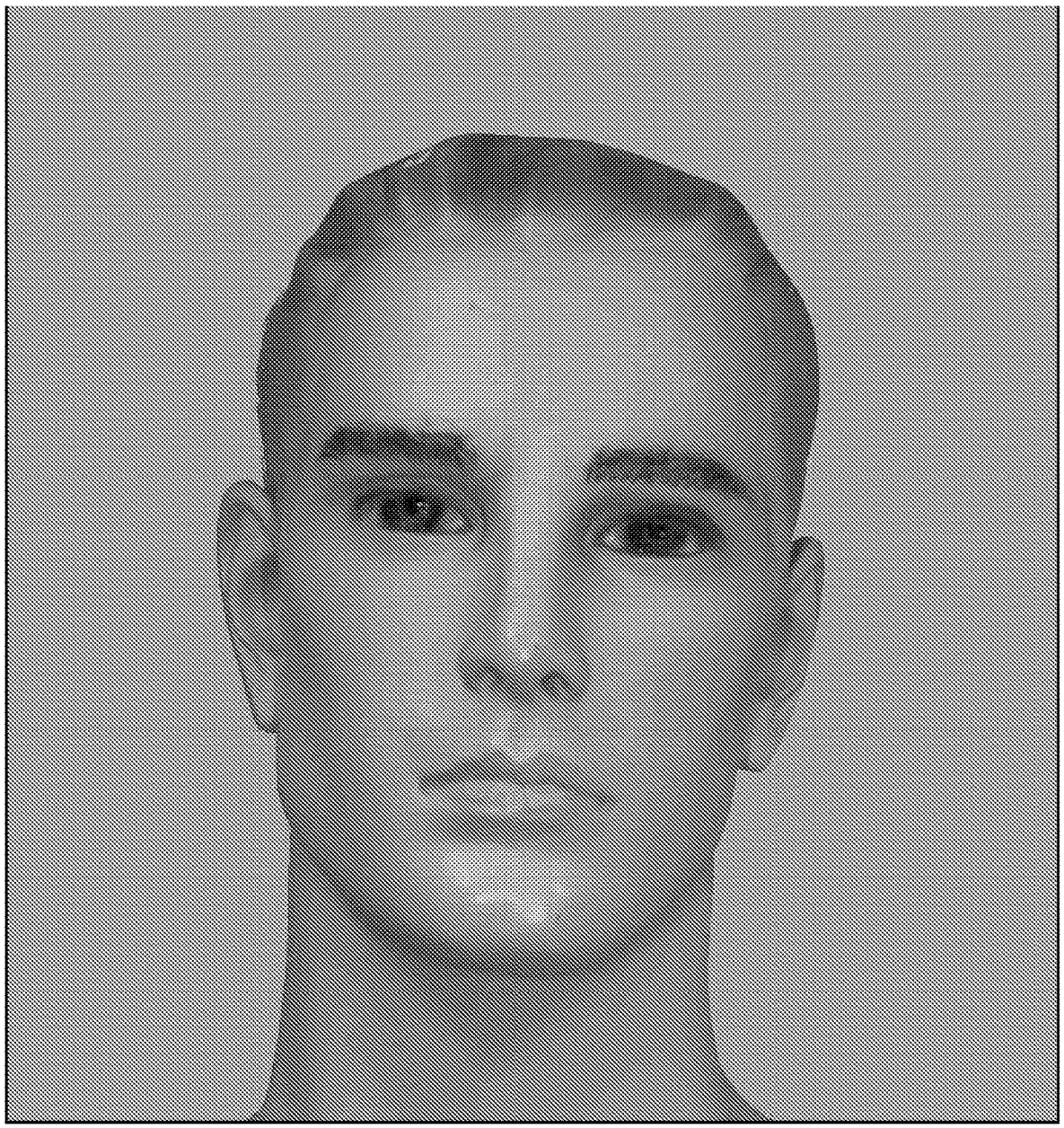
FIG. 17 is an image resulting from analysis of the images shown in FIGS. 15 and 16 where the background of the image is overwritten with an arbitrary color value.

FIGS. 15 and 16 are images taken of the head of a dummy. The background is a LCD monitor covered with cheesecloth (to diffuse the light and, more importantly, to prevent Moiré effects). Moiré effects are generated when the spatial pixel frequency of the camera is effectively close to that of the monitor. In FIG. 15 the LCD monitor is switched on, whereas in FIG. 16 the LCD monitor is switched on.

By analyzing these images and determining which pixels exhibit a significant change in their brightness value the backdrop can be identified. These pixels can then be overwritten with any arbitrary value (such as e.g. 18% grey, a common value), which is done in FIG. 17. Note that any grey scale or color value can be assigned or, indeed, any pattern can be applied to the background once identified.

Enrollment Application Baseline Additions and Modifications

Additional embodiments are within the scope of the present invention. The additions and modifications discussed below may be required to advance capabilities and to further elaborate on the enrollment process. For example, certain embodiments are described for existing clients, such as the U.S. Postal Service, the U.S. Department of State, U.S. Navy and U.S. Air Force, expressing deep interest in the present enrollment system (both hardware and software). The following modifications and additions are provided as outlined below.

Fingerprint Template Generator

The fingerprint template generator may be adapted to generate INCITS 378 finger images for both left and right index fingers (typical for United States Government Identification Credential Programs) or any other/all fingers as may be required by the customer. This standard allows interoperability of templates for use with 1 to 1 biometric matching. NIST recognizes the template generator algorithm of the present invention as the best INCITS 378 template generator of all those submitted and tested to date.

Enrollment Summary Screen

For the case where enrollment is semi-assisted, for example, as a service offering to citizens by the United States Postal Service (USPS) personnel, in one embodiment, it may be desirable to add the following to support proof that the individual standing in front of the kiosk did in fact use his or her proper documents or biometrics during capture. This can be achieved by adding the following options:

Add the extracted photo from the passport (if provided), from the Drivers License (if provided) to the summary screen and label the photos accordingly. This provides the enrollment operator with proof that the enrollee standing in front of them in fact used their specific passport and/or drivers license during the unattended enrollment process.

The iris unit may be adapted to capture a photo at the same time as the iris capture occurs. If included, then the photo can be captured and also included in the summary screen and labeled as such. In one embodiment, the iris vendor unit may be configured such that a photo of the individual having his or her iris's photographed may be obtained along with the image of the iris itself. The present invention may have a facial camera in the main body of the kiosk, and the capture process may be integrated along with the iris capture processing.

The combination of driver's license and/or passport pictures lifted from the breeder documents, facial image captured during enrollment and iris photo taken during iris capture aid in the overall integrity of the enrollee's enrollment and serves as later adjudication validation process verification within the card management adjudication process session. This is yet another point of superiority over others in the enrollment field and more importantly, a feature that is critical to customer needs pre, in-process and post identity proofing.

The present invention includes collection of enrollee provided documents and a capture validation process. The documents that may be collected are not limited in any way but may include all documents that have been captured during the enrollment of the particular enrollee (e.g., Drivers' License, Passport) along with an image cropped from each respective document along with photos of the individual captured during photo capture, fingerprint capture, iris capture and signature capture.

Citizen Data

The present invention allows for the capture of more than one document. For example, the present invention may be adapted to provide the capability for the capture of both the Drivers' License and Passport during enrollment. The present invention may be adapted to allow either document or both documents to be captured or provided by the enrollee.

Breeder documents vary between end-customers, so software configuration control may be provided based on the particular enrollment being processed. Each enrollment regardless of end-customer may accommodate multiple breeder document capture and validation.

With this said, it should be noted that there exists a small number of acceptable breeder documents with much overlap of acceptability between end-customers. As such, when processing breeder documents, the monitor display may provide icons for each of the acceptable breeder documents for the specific enrollment being processed and account for the minimum number of required breeder documents to successfully meet the end-customer's enrollment requirements.

The kiosk (e.g., 100, 200, 300, 400, 500, etc.) of the present invention is configured to capture and process documents required for obtaining a variety of other documents, including documents required to obtain a U.S. Passport. The kiosk is configured to process documents that include, but are not limited to: driver's licenses, credit cards, I-9 forms, birth certificates, previous passports, citizenship certificates, consular reports of birth, school records, baptismal certificates, census records, bible records, doctor's records, marriage certificates, social security cards, library cards, military identification documents, and others. The present kiosk design provides a scanner for passport sized documents in addition to a reader for card size breeder documents. The kiosk also contains a sheet-feed scanner that may be adapted to accept 8½ inch (0.22 m)×variable length documents. The scanners may be modified to scan any size document as needed. The card size reader has a mechanical transport mechanism that grabs the cards edge once the card is manually put in contact with the unit that consumes the card for digitization and return to the enrollee.

All standard card size breeder documents may be processed through the card reader unit. The document scanner unit may be adapted to capture the front and back of the presented card in one pass and processed under both white light and infrared light. These images may be made part of the enrollment record.

If a particular enrollment type being processed requires that an identity card be verified for authenticity, that card may then be requested to be read by the scanner to perform this function. The enrollee or operator must manually place the card within the scanner. The card may be requested face down into the scanner, the scanner may perform image capture and audibly beep upon completion plus be prompted through the monitor display to remove the card and reinsert it into the scanner back side of card down. This manual process of imaging the front and back of the card may be required of all card size breeder documents requiring authenticity verification. Once the backside of the card is processed the scanner beeps and the monitor prompts the user to remove the card from the scanner and proceed to the next step in the enrollment process.

Note: The scanner through the SDK of the present invention and library contains a configuration setting that commands the kiosk scanner to read the card, beep when scanned for the enrollee or operator to remove the card, flip it over and insert it again for a scan of the back side of the card. The scanner may again beep confirming to the enrollee or operator to remove the card.

Additional breeder documents as required based on the particular enrollment type to be processed may also be requested for digitization and appropriately processed.

Candidate Design Vision:

The enrollment application contains a software configuration that is executed at run-time with these controls that later provide and drive the corresponding enrollment process. Document Capture icons are compiled and displayed per the configuration settings to guide and drive the enrollee or operator.

Each document icon is selectable (one at a time) by the enrollee or operator to kick-off that documents capture, digitization and if applicable authenticity verification. This process is driven by the type of document being captured. For example, if a Driver's License, Military ID, Common Access Card or Passport Card is selected, the document scanner may be adapted to capture the card followed by insertion into the scanner for authenticity check. If a Passport is selected, then the scanner would be used to capture the document and perform authenticity verification.

After each document is processed, that specific icon is grayed out and no longer active to select. Prompts on the screen are given based on the specific requirements of the enrollment being processed such that the enrollee is guided with information pertinent to what documents apply and what or how many documents are "left to go" based on mandatory requirements imposed by the end-customer for enrollment compliance.

Once the requirements are met the enrollment process automatically moves to the next steps in the enrollment process.

Note that evidence may be captured of whom (enrollee or operator) is providing the documents each time a document is selected or feed into the appropriate scanner for chain of evidence processing.

Digital Signature Screen

A touch-screen numerical keypad may be provided for Enrollee password generation as an addition to the PIV required use of passwords and for use as a temporary password during the card activation process. This data may be forwarded to a system that uses enrollment data entry in XML format through an existing field such as Address Field 1.

One possible layout provides the keypad in relatively large size. The layout may be adapted to look like a phone keypad that provides a low beep tone when a number is selected. The present invention may be adapted to include a counter to provide feedback to the user on how many numbers have been selected/pushed and how many total digits are required. For example, "You have entered 3 digits of the required 8 digit PIN".

The software may have a configurable parameter to set the size of the numerical password and for the message to be displayed to the enrollee. Default message for display may be (x indicates PIN number size), "Enter your x digit PIN number to be used to protect your Card". The user may be prompted to enter a password that is x size in length based on the configured password size.

Facial Image Capture

The present process requires the operator or enrollee to touch the live image window to capture the image which then transfers to the bottom left window along with landmarks. The process of creating an ICAO/INCITS/ISO image requires the user to touch the "Normalize" button to then do the normalization and create/show the normalized image. The process may be changed so that once an image is selected (touching the live image window) the landmark image and normalized image process automatically. The process may be changed so that the size of the images is all the same size and displayed in a row across.

Fingerprint Capture

The fingerprint sensors may be enabled manually or automatically. Buttons such as "Connect"/"Disconnect" may be provided or removed as needed.

Enrollment Application Start-Up and Control

In the present invention, the Enrollment application startup may be adapted to commence with a user double-clicking the application short-cut icon on the desktop. The concept of "enrollment selectivity" has surfaced many times as to how to handle multiple types of enrollment needs. As for example, at one kiosk, three different enrollment needs such as HSPD-12 PIV, Department of Transportation Transportation Worker Identification Credential (TWIC) and First Responder may be required and provided. The present invention allows an individual to know what enrollment application to select so as to assure that a proper and correct enrollment is processed. The present invention provides a solid response and method to assure the above. Specifically, the present invention includes functionality in the enrollment application as follows (using the USPS as an example):

An Individual requiring an enrollment enters a USPS or other enrollment facility and proceeds to the checkout counter. The clerk processes the individual as appropriate, by scanning the appropriate enrollment barcode from their worksheet, receiving payment (if required) and printing a receipt to be used at the enrollment kiosk. The printed receipt contains a unique barcode for the specific enrollment that is required.

The individual approaches the kiosk, selects "Start Enrollment" from the main window on the kiosk screen and is prompted to scan their receipt on the Passport reader device. The reader scans the receipt, and the application processes the barcode to select the proper enrollment configuration file for the appropriate enrollment process.

When the enrollment is fully completed or if the user aborted enrollment, the application always returns to "Start Enrollment" Window. Memory is flushed clean and all data is removed within the application, which preserves integrity of the system and security of all collected data.

From an architecture and deployment perspective, the start enrollment module may be configuration file controlled so as to maintain enrollments as are required. That is, the present invention may be adapted to add additional enrollment types and their associated barcode numbers by changing the configuration file. The start application then launches the enrollment application and its corresponding configuration file that controls the enrollment application process (i.e., titles, biometrics to collect, breeder documents to collect, order to collect, quality requirements, etc.). In providing the above, the present invention maintains flexibility and configuration control through the configuration files.

Web Service—Controller

As will always be the case with enrollment kiosk deployments, one or more kiosks may be deployed in the field and require communications to a central function so that enrollment records can be accepted, manipulated, stored and/or processed.

The Web Service Controller may serve as the kiosk's single point of connectivity, control and status reporting.

Security is a critical factor in an enrollment system as the integrity of the enrollment data record and privacy of enrollee's personal information is paramount in all regards. To this, the system may utilize TecSec Constructive Key Management (CKM) product to secure the data and roles of use, be it personnel or machine interaction, transfer or viewing. CKM is recognized as an X.9 standard and is a heavily patented product that covers Simple Object Access Protocol (SOAP), XML and many other security implementations of data.

As kiosks are distributed in various locations, they must be considered "in the wild" given that the element of their trust is unknown and non-existent. This also applies to kiosk to Web Service communications. Therefore, a secure communications protocol between kiosks and the Web Service must be established to ensure that rouge kiosks are not allowed communications with the Web Service to submit enrollment data records and that data transferred is transferred with security and integrity.

Auditing and log functions must be provided so that Administrators and Management may utilize these services for accountability and as records of use history.

The Web Service must also be scalable so as to be able to handle thousands of connected kiosks operating at random intervals across the kiosks physical domain space.

Web Service—Pre-Filters

As enrollments records are created and communicated to the Web Service Central Interface, pre-filter checks must be available as an option to be determined by the Customer. Pre-filter checks include all, none or any combination of facial, fingerprint and iris one-to-many biometric matching. The Web Service must be configurable to meet each customer's specific requirements for pre-filter biometric checks.

The process for each of these pre-filters includes duplicate checking of enrollment records through facial, fingerprint, and iris matching.

Specifically, the process includes duplicate checking of enrollment records through facial image biometric matching against the then current enrollment population. As enrollments are being processed, a facial image database and matching system may be installed/created so that every new enrollment record is one-to-many matched to assure that a duplicate enrollee is not processed by the system. The process for this commences by the Web Service parsing out the facial image of the received enrollment record and passing this image through its interface to the facial image matching system. The received enrollment record is held by the Web Service until a match result is received back from the facial image matching system. If a match is found, the Web Service receives this result along with the record data that the enrollment image matched against. The Web Service then forwards this data plus the date/time stamp of the match result and facial image matching system ID to the Adjudication system for further processing. The record is then sent to the enrollment database system with a duplicate match flag set and the corresponding record number that resulted in a duplicate match result. If a no match results from the one-to-many match, the Web Service receives this result from the match system, packages/formats the record as required and sends the data to the data record storage system. The no-match (non-duplicate) field is set to True and provided along with match time and date stamp and matcher system ID appended to this record.

The process also includes duplicate checking of enrollment records through biometric matching (finger, face, iris, signature, voice, etc.) against the then current enrollment population. Using fingerprint matching as an example, as enrollments are being processed, a fingerprint database and matching system may be installed/created so that every new enrollment record is one-to-many matched to assure that a duplicate enrollee is not processed by the system. The process for this commences by the Web Service parsing out the fingerprint images of the received enrollment record and passing these image through its interface to the fingerprint matching system. The received enrollment record is held by the Web Service until a match result is received back from the fingerprint matching system. If a match is found, the Web Service receives this result along with the record data that the enrollment image matched against. The Web Service then forwards this data plus the date/time stamp of the match result and fingerprint matching system ID to the Adjudication system for further processing. The record is then sent to the enrollment database system with a duplicate match flag set and the corresponding record number that resulted in a duplicate match result. If a no match results from the one-to-many match, the Web Service receives this result from the match system, packages/formats the record as required and sends the data to the data record storage system. The no-match (non-duplicate) field is set to True and provided along with match time and date stamp and matcher system ID appended to this record.

The process also includes duplicate checking of enrollment records through iris biometric matching against the then current enrollment population. As enrollments are being processed, an iris database and matching system may be installed/created so that every new enrollment record is one-to-many matched to assure that a duplicate enrollee is not processed by the system. The process for this commences by the Web Service parsing out the iris images of the received enrollment record and passing these images through its interface to the iris matching system. The received enrollment record is held by the Web Service until a match result is received back from the iris matching system. If a match is found, the Web Service receives this result along with the record data that the enrollment image matched against. The Web Service then forwards this data plus the date/time stamp of the match result and iris matching system ID to the Adjudication system for further processing. The record is then sent to the enrollment database system with a duplicate match flag set and the corresponding record number that resulted in a duplicate match result. If a no match results from the one-to-many match, the Web Service receives this result from the match system, packages/formats the record as required and sends the data to the data record storage system. The no-match (non-duplicate) field is set to True and provided along with match time and date stamp and matcher system ID appended to this record. The same can be said and explained for facial, voice and signature biometrics.

Web Service—Record Store and Forward

After pre-filter processing, the Web Service may forward the enrollment record as required by the Customer. The default forwarding of the enrollment record may be to a commercially available database in a pre-defined format. Each record may contain the fields defined and provided in an Enrollment Record Data library document (ERDL). The ERDL contains all enrollment, system and configuration data fields along with their respective security classification.

The Web Service—Record Store and Forward may also provide a means to format enrollment data as required by Customers for other third party databases system and proprietary systems. For example, the present invention may include a system that uses enrollment data entry in XML format.

In all cases, the Web Service may provide a means to store system data (non-specific enrollment Data) for future use and reference. This data is import to Administrators and Systems Engineering for system support and metrics analysis.

Kiosk Discovery

As kiosks are brought on-line within the domain space, the Web Service may provide or be provided with a means to register the kiosk as an appropriate and active enrollment device for all future enrollment data transmissions and storage requests.

The registration process may provide a means to establish a known and trusted device brought on-line from any location, communications path or installation service provider. Installers may not necessarily be viewed as trusted as they might not be known until the time of on-sight installation. Therefore a trusted protocol may not be established through personnel to achieve a trusted registration of an appropriate device.

In one aspect of the present invention, a registration key, or the like, may be installed during the application software installation phase of bringing a kiosk to completion for installation. Registration of this key must also work with the Web Service so that the kiosk and Web Service align properly once installed in the field and communicating to the operational Web Service.

The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), microcontrollers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present invention have been illustrated and described, it is to be understood that the present invention is not limited to the precise construction and compositions disclosed herein and that various modifications, changes, and variations can be apparent from the foregoing descriptions without departing from the spirit and scope of the invention as defined in the appended claims. It is further understood that embodiments may include any combination of features and aspects described herein.

The invention claimed is:

1. A device for collecting personal data from an enrollee for identity proofing by a remote operator, comprising:
a main module including a processor;
one or more biometric sensing devices coupled to the processor, the one or more biometric sensing devices being configured to capture at east one biometric of the enrollee;
one or more document scanners coupled to the processor, the one or more document scanners configured to scan an identifying document presented by the enrollee to the one or more document scanners and produce a visual representation of the scanned identifying document, the identifying document including personally identifying information of the enrollee;
a scene camera configured to monitor and capture a video of an uninterrupted area surrounding the device, the uninterrupted area encompassing at least: (i) the one or more biometric sensing devices; (ii) the one or more document scanners; (iii) a source of the at least one biometric of the enrollee during the enrollment session; and (iv) the enrollee, such that interactions by the enrollee during the enrollment session with the one or more biometric sensing devices or the one or more document scanners are monitored by the scene camera; and
one or more tamper detection or tamper resistance components;
wherein the processor is operable to: initiate an enrollment session, wherein the enrollment session includes collection and proofing of at least the at least one biometric of the enrollee and the document presented by the enrollee for issuance of a credential establishing an identity of the enrollee;
transmit the captured video of the uninterrupted area surrounding the device to a remote station located remotely from the device, the transmitted captured video including actions taken by the enrollee during the enrollment session;
facilitate a remotely-assisted enrollment at the device during the enrollment session while the processor transmits the video of the uninterrupted area surrounding the device to the remote station to allow a remote operator to participate remotely in the enrollment session with the enrollee, wherein the remote operator validates the actions of the enrollee as the enrollee interacts with the remote enrollment station to ensure and validate that the enrollee is the entity interacting with the remote enrollment station;
collect from the enrollee, during the enrollment session, the captured at least one biometric via the one or more biometric sensing devices and the produced visual representation of the identifying document via the one or more documents scanners;
responsive to the collection of the at least one biometric and the visual representation of the scanned identifying document, transmit to the remote station for verification by the remote operator during the enrollment session (i) the at least one biometric or (ii) the visual representation of the scanned identifying document;
receive a signal from the remote station during the enrollment session, the signal being indicative of a human-machine input made by the remote operator on a remote operator computer during the remote operator's participation in the enrollment session, the signal being further indicative of (i) a determination by the remote operator that the captured biometric or the visual representation of the scanned identifying document is not acceptable, or (ii) a determination that the captured biometric or the visual representation of the scanned identifying document is acceptable;

responsive to the signal being indicative of the determination that the captured biometric or the visual representation of the scanned identifying document is not acceptable, cause the one or more biometric sensing devices to recapture the at least one biometric of the enrollee or causing the one or more document scanners to rescan the identifying document to produce a new visual representation of the scanned identifying document;

encrypt the collected at least one biometric and the visual representation of the identifying document;

transmit the encrypted at least one biometric and the encrypted visual representation of the identifying document as an identity profile to the remote station for remote identity proofing by the remote operator, said remote identity proofing including proofing in real-time the identity of the enrollee based on the at least one biometric and the encrypted visual representation of the identifying document; and responsive to transmitting the identity profile, terminate the enrollment session;

wherein the processor is configured to cause a modification to the enrollment session based on the signal during the remote operator's remote participation in the enrollment session and prior to the identity profile being transmitted to the remote station, the modification including recapturing the at least one biometric or rescanning the identifying document.

2. The device of claim 1, wherein the processor includes a security protocol that prevents access to any personal data collected during an enrollment session.

3. The device of claim 1, wherein the one or more biometric sensing devices is a face camera for capturing an image of a face of the enrollee, the face camera being coupled to the processor; a dual iris camera for capturing an image of a left iris and a right iris of the enrollee, the dual iris camera being coupled to the processor; a digital signature window for capturing a signature of the enrollee, the digital signature window being coupled to the processor; or any combination thereof.

4. The device of claim 1, wherein the one or more biometric sensing devices includes a dual iris camera coupled to the processor, the dual iris camera including a screen located proximate the dual iris camera to provide guidance to the enrollee regarding the enrollee's positioning relative to the dual iris camera.

5. The device of claim 1, wherein the one or more document scanners is a smartcard reader; a single-side scanner; a dual-side scanner for scanning identification cards and credit cards; a dual-side scanner for scanning documents having a width of about 8.5 inches (0.22 m) or less and any length; or any combination thereof.

6. The device of claim 1, wherein the processor is configured to capture and verify integrity of all information present on the identifying document such as a passport or a state identification card provided by the enrollee.

7. The device of claim 1, wherein the one or more tamper detection components includes at least one sensor configured to detect movement of the device.

8. The device of claim 7, wherein the processor is configured to activate the scene camera responsive to the at least one sensor detecting movement of the device.

9. The device of claim 1, wherein the one or more tamper resistance components includes an alarm configured to activate responsive to movement of the device.

10. The device of claim 1, wherein the one or more tamper resistance components includes one or more locks configured to prevent unauthorized access to an interior of the device.

11. The device of claim 1, wherein the enrollee is present for the entirety of the enrollment session.

12. The device of claim 1, wherein the one or more input devices or the one or more biometric sensing devices are integrally coupled with the main module.

13. The device of claim 1, wherein the processor is further operable to, responsive to the enrollment session requiring operator authentication, receive an operator credential from a remote operator and validate the operator credential prior to executing the enrollment session on the device.

14. The biometric device of claim 1, wherein the modification to the enrollment session includes (i) causing the enrollee to take an action related to the enrollment session at the device, or (ii) providing instructions to the enrollee.

15. The biometric device of claim 1, wherein the modification to the enrollment session includes providing instructions to the enrollee.

16. The device of claim 1, wherein the processor is further operable to, responsive to the enrollment session requiring enrollee authentication, received an enrollee credential from the enrollee and validate the enrollee credential prior to executing the enrollment procedure on the device.

17. The device of claim 1, wherein communications between the device and the remote station take place over a mutually authenticated and mutually encrypted session.

18. A method of collecting data from a user, comprising:
monitoring, by a scene camera mounted to the device and coupled to a processor of the device, an uninterrupted area surrounding the device, the uninterrupted area encompassing at least: (i) one or more biometric sensing devices mounted to the device and coupled to the processor of the device, the one or more biometric sensor being configured to capture at least one biometric of the enrollee; (ii) one or more document scanners mounted to the device and coupled to the processor of the device, the one or more document scanners being configured to scan an identifying document presented by the enrollee and produce a visual representation of the scanned identifying document, the identifying document including personally identifying information of the enrollee; (iii) a source of at least one biometric of the enrollee during the enrollment session; and (iv) a face of the enrollee;
continuously transmitting a video of the uninterrupted area surrounding the device; initiating the enrollment session at the device for issuance of a credential establishing an identity of the enrollee;
facilitating the remotely-assisted enrollment at the device during the enrollment session while the video of the uninterrupted area surrounding the device is transmitted to a remote station to allow a remote operator to participate remotely in the enrollment session with the enrollee, wherein the remote operator validates the actions of the enrollee as the enrollee interacts with the remote enrollment station to ensure and validate that the enrollee is the entity interacting with the remote enrollment station;

collecting, via the one or more biometric sensing devices, the captured at least one biometric of the enrollee at the device;

collecting, via the one or more documents scanners, the produced visual representation of the scanned identifying document via the one or more documents scanners;

responsive to the collection of the at least one biometric and the visual representation of the scanned identifying document, transmitting to the remote station for verification by the remote operator during the enrollment session (i) the at least one biometric or (ii) the visual representation of the scanned identifying document;

receiving a signal from the remote station during the enrollment session, the signal being indicative of a human-machine input made by the remote operator on a remote operator computer during the remote operator's participation in the enrollment session, the signal being further indicative of (i) a determination by the remote operator that the captured biometric or the visual representation of the scanned identifying document is not acceptable, or (ii) a determination that the captured biometric or the visual representation of the scanned identifying document is acceptable;

responsive to the signal being indicative of the determination that the captured biometric or the visual representation of the scanned identifying document is not acceptable, causing the one or more biometric sensing devices to recapture the at least one biometric of the enrollee or causing the one or more document scanners to rescan the identifying document to produce a new visual representation of the scanned identifying document;

encrypting the collected at least one biometric and the visual representation of the identifying document;

transmitting the encrypted at least one biometric and the encrypted visual representation of the identifying document as an identity profile to the remote station for remote identity proofing by the remote operator, said remote identity proofing including proofing in real-time the identity of the enrollee based on the at least one biometric and the encrypted visual representation of the identifying document; and terminating the enrollment session responsive to transmitting the identity profile;

wherein the processor is configured to cause a modification to the enrollment session based on the signal during the remote operator's remote participation in the enrollment session and prior to the identity profile being transmitted to the remote station, the modification including recapturing the at least one biometric or rescanning the identifying document.

19. The method of claim 18, wherein the remote operator participates remotely for the entirety of the enrollment session.

20. The method of claim 18, wherein the modification to the enrollment session includes (i) causing the enrollee to take an action related to the enrollment session at the device, or (ii) providing instructions to the enrollee.

* * * * *